(12) United States Patent
Zhao et al.

(10) Patent No.: US 7,581,902 B2
(45) Date of Patent: Sep. 1, 2009

(54) IN SITU IMMOBILIZATION OF METALS IN CONTAMINATED SITES USING STABILIZED IRON PHOSPHATE NANOPARTICLES

(75) Inventors: Dongye Zhao, Auburn, AL (US); Zhong Xiong, Auburn, AL (US); Mark Barnett, Auburn, AL (US); Ruiqiang Liu, Auburn, AL (US); Willie F. Harper, Auburn, AL (US); Feng He, Auburn, AL (US)

(73) Assignee: Auburn University, Auburn, AL (US)

( * ) Notice: Subject to any disclaimer, the term of this patent is extended or adjusted under 35 U.S.C. 154(b) by 245 days.

(21) Appl. No.: 11/680,266

(22) Filed: Feb. 28, 2007

(65) Prior Publication Data

US 2007/0203388 A1     Aug. 30, 2007

Related U.S. Application Data

(60) Provisional application No. 60/860,305, filed on Nov. 21, 2006, provisional application No. 60/777,309, filed on Feb. 28, 2006.

(51) Int. Cl.
*B09C 1/00*     (2006.01)

(52) U.S. Cl. .............................................. 405/128.45

(58) Field of Classification Search ................ 977/903; 405/128.1, 128.45, 128.5
See application file for complete search history.

(56) References Cited

U.S. PATENT DOCUMENTS

| 6,777,449 | B2 | 8/2004 | Vance et al. |
| 2002/0006658 | A1 | 1/2002 | Horn et al. |
| 2002/0006867 | A1 | 1/2002 | Ponder et al. |
| 2003/0217974 | A1* | 11/2003 | Uegami et al. .............. 210/722 |
| 2005/0013759 | A1 | 1/2005 | Grow |

FOREIGN PATENT DOCUMENTS

WO     WO 03/013252     2/2003

OTHER PUBLICATIONS

Completely "Green" Synthesis and Stabilization of Metal Nanoparticles Poovathinthodiyil Raveendran, Jie Fu, and Scott L. Wallen, J. AM. Chem. Soc. 9 vol. 125, No. 46, 2003 13941.*
Gee, G.W. and D. Or (2002) "Particle-size analysis: pipette method," In: Dane, J.H., Topp, G.C. (Eds), Methods of Soil Analysis (Part 4): Physical Methods. Soil Science Society of America, Madison, Wisconsin, pp. 272-278.

(Continued)

*Primary Examiner*—John Kreck
(74) *Attorney, Agent, or Firm*—Andrus, Sceales, Starke & Sawall, LLP

(57) ABSTRACT

A method for preparing a class of highly stabilized and soil-dispersible nanoparticles and using the nanoparticles as a remediation technology for immobilizing toxic metals at toxic metal contaminated sites. The method employs a composition containing select polysaccharides (starch or cellulose) as a stabilizer for the nanoparticles in a liquid carrier, and results in suspensions of nanoparticles of desired size and mobility in water, soils or sediments. The stabilizer can facilitate controlling the dispersibility of the nanoparticles in the liquid carrier. An effective amount of the composition is delivered to a contaminated site so that the nanoparticles can immobilize one or more toxic metals of the contaminated site.

38 Claims, 23 Drawing Sheets

OTHER PUBLICATIONS

Han, F.X. et al. (2001) "Accumulation, distribution, and toxicity of copper in sediments of catfish ponds receiving periodic copper sulfate applications." J. Eviron. Qual. vol. 30, pp. 912-919.

Harris, W.G. (2002) "Phosphate minerals." In: Dixon, J.B. Schulze, D.G. (Eds), Soil Mineralogy with Environmental Applications. Soil Science Society of America, Madison, Wisconsin, p. 638.

He, F. and D. Zhao (2005) "Preparation and characterization of a new class of starch-stabilized bimetallic nanoparticles for degradation of chorinated hydrocarbons in water." Environ. Sci. Technol. vol. 39, pp. 3314-3320.

He, F., D. Zhao, J. Liu, and C.B. Roberts (2006) "Stabilization of Fe-Pd nanoparticles with sodium carboxymethyl cellulose for enhanced transport and dechlorination of trichloroethylene in soil and groundwater." Ind. Eng. Chem. Res. (in press).

Kim, D.K. et al. (2003) "Protective coating of superparamagnetic iron oxide nanoparticles." Chem. Mater. vol. 15, pp. 1617-1627.

Kunze, G.W. and J.B. Dixon (1986) "Pretreatment for mineralogical analysis." In: Klute, A. (Ed), Methods of Soil Analysis (Part I): Physical and Mineralogical Methods, 2nd Ed., American Society of Agronomy and Soil Science of America, Madison, Wisconsin, pp. 91-100.

Laperache, V. et al. (1996) "Chemical and mineralogical characterizations of Pb in a contaminated soil: reactions with synthetic apatite." Environ. Sci. Technol., vol. 30, pp. 3321-3326.

Lindsay, W.L. (1979) "Chemical Equilibria in Soils." John Wiley & Sons, Inc., New York, p. 164.

Admassu, W. and T. Breese, (1999) "Feasibility of using natural fishbone as a substitute for hydroxyapatite in remediating aqueous heavy metals." J. Hazard Mater. 69, pp. 187-196.

Astrup, T., S.L.S. Stipp, and T.H. Christesne (2000) "Immobilization of chromate form coal fly ash leachate using an attenuating barrier containing zero-valent iron." Environ. Sci. Technol. 34, pp. 4163-4168.

ATSDR: Agency for Toxic Substances and Disease Registry, U.S. Department of Health and Human Services (2005) "CERCLA Priority List of Hazardous Substances." website: http://www.atsdr.cdc.gov/cercla/05list.html.

Berti, W.R. and S.D. Cunningham (1997) "In place inactivation of Pb in Pb contaminated soils." Eviron. Sci. Technol. vol. 31, pp. 1359-1364.

Buatier, M.D., S. Sobabska and F. Elsaas (2001) "TEM and EDX investigation on Zn and Pb contaminated soils." Appl. Geochem. vol. 16, pp. 1165-1177.

Cao, X. et al. (2002) "Impacts of phosphate amendments on lead biogeochemistry at a contaminated site." Eviron. Sci. Technol. vol. 36, pp. 5296-5304.

Chen, M. et al. (2003) "Field demonstration of in situ immobilization of soil Pb using P amendments." Adv. Environ. Res., vol. 8, pp. 93-102.

Chen, S.B., Y.G. Zu and Y.B. Ma (2005) "The effect of grain size of rock phosphate amendment on metal immobilization in contaminated soils." J. Hazard Mater. vol. 134, pp. 74-79.

Cotter-Howells, J. and S. Caporn (1996) "Remediation of contaminated land by formation of heavy metal phosphates." Appl. Geochem., vol. 11, pp. 335-342.

Eighmy, TT. et al. (1997) "Heavy metal stabilization in municipal solid waste combustion dry scrubber residue using phosphate." Environ. Sci. Technol. vol. 31, pp. 3330-3338.

Ewers, U. and H.W. Schlipköter (1991) "Lead In: Merian, E. (Ed)," Metals and Their Compounds in the Environment. VCH Publishers, Inc., New York, p. 971.

Lower, S.K., P.A. Maurice, and S.J. Traina (1998) "Simultaneous dissolution of hydroxylapatite and precipitation of hydroxypryromorphite: Direct evidence of homogeneous nucleation." Geochim, Cosmochi. Ac. vol. 62, pp. 1773-1780.

Ma, Q.Y., S.J. Traina, and T.J. Logan (1993) "In situ lead immobilization by apatite." Environ. Sci. Technol. vol. 27, pp. 1803-1810.

Ma, Q.Y., T.J. Logan and S.J. Traina (1995) "Lead immobilization from aqueous solutions and contaminated soils using phosphate rocks." Environ. Sci. Technol. vol. 29, pp. 1118-1126.

Ma, L.Q., and G.N. Rao (1999) "Aqueous Pb reduction in Pb-contaminated soils by phosphate rocks." Water Air Soil Poll. vol. 110, pp. 1-16.

Melamed, R. et al. (2003) "Field Assessment of lead immobilization in a contaminated soil after phosphate application." Sci. Total Environ. vol. 305, pp. 117-127.

Moore, A.M., C.H. De Leon and T.M. Young (2003) "Rate and extent of aqueous perchlorate removal by iron surfaces." Environ. Sci. Technol. vol. 37, pp. 3189-3198.

Nriagu, J.O. (1972) "Stability f vivianite and ion-pair formation in the system Fe3(PO4)2-H3PO4-H2O." Geochim. Cosmochim. Ac. vol. 36, pp. 459-470.

Peltier, E., A.L. Dahl and J.F. Gaillard (2005) "Metal speciation in anoxic sediments: when sulfides can be construed as oxides." Environ. Sci. Technol., vol. 39, pp. 311-316.

Ralph, J. and I. Chau (2006) "Vivianite." website: http://www.mindat.org/copyrights.php.

Reynolds, C.S. and P.S. Davies (2001) "Sources and bioavailability of phosphorus fractions in fresh waters: a British perspective." Biol. Rev. vol. 76, pp. 646-654.

Ruby, M.V. et al. (1996) "Estimation of lead and arsenic bioavailability using a physiologically based extraction test." Environ. Sci. Technol. vol. 30, pp. 422-430.

Ruby, M.V. et al. (1999) "Advances in evaluating the oral bioavailability of inorganics in soil for use in human health risk assessment." Environ. Sci. Technol. vol. 33, pp. 3697-3705.

Ryan, J.A. et al. (2001) "Formation of chloropyromorphite in a lead-contaminated soil amended with hydroxyapatite." Environ. Sci. Technol. vol. 35, pp. 3798-3803.

Scheckel, K., et al. (2003) "Assessment of a sequential extraction procedure for perturbed lead-contaminated samples with and without phosphorus amendments." Environ. Sci. Technol. vol. 37, pp. 1892-1898.

Si, S. et al. (2004) "Size-controlled synthesis of magnetite nanoparticles in the presence of polyelectrolytes." Chem. Mater. vol. 16, pp. 3489-3496.

Sonmez, O. and M. Pierzynski (2005) "Phosphorus and manganese oxides effects on soil lead bioaccessibility: PBET and TCLP." Water Air Soil Poll. 166, 3-16.

Stanforth, R. and J. Qiu (2001) "Effect of phosphate treatment on the solubility of lead in contaminated soil." Environ. Geol. vol. 41, pp. 1-10.

Su, C. and R.W. Puls (2001) "Arsenate and arsenite removal by zero-valent iron: Kinetics redox transformation, and implications for in situ groundwater remediation." Environ. Sci. Technol. vol. 37, pp. 1487-1492.

Tessier, A., P.G.C. Campell and M. Bisson (1979) "Sequential extraction procedure for the speciation of particulate trace metals." Anal. Chem. vol. 51, pp. 844-851.

Theodoratos, P., N. Papassiopi and A. Xenidis (2002) "Evaluation of monobasic calcium phosphate for the immobilization of heavy metals in contaminated soils from Lavrion." J. Hazard. Mater. vol. 94, pp. 135-146.

Thomas, G.W. (1996) "Soil pH and soil acidity." In: Sparks, D.L. (Ed), Method of Soil Analysis (part 3): Chemical Methods. American Society of Agronomy and Soil Science Society of America, Madison, Wisconsin, pp. 475-489.

Traina, S. J. and V. Laperche (1999) "Contaminant bioavailability in soils, sediments and aquatic environments." Proc. Natl. Acad. Sci. U.S.A. vol. 96, pp. 3365-3371.

USDA et al.: United States Department of Agriculture, Natural Resources Conservation Service, National Soil Survey Center (1996) "Soil Survey Laboratory Methods Manual" (Soil Survey Investigation Report No. 42, Version 3.0) p. 203.

USEPA: U.S. Environmental Protection Agency, (1992) "Method 1311." website: http://www.epa.gov/epaoswer/hazwaste/test/pdfs/1311.pdf.

USEPA: U.S. Environmental Protection Agency (1996) Acid Digestion of Sediments, Sludges, and Soils, Method 3050B, Revision 2. Washington D.C.

USEPA: U.S. Environmental Protection Agency (1999) website: http://www.epa.gov/superfund/_sites/query/advquery.htm.

USEPA: U.S. Environmental Protection Agency Region 10, (2001) Consensus plan for soil and sediment Studies: Coeur d'Alene River soils and sediments bioavailability studies (URS DCN: 4162500.06161.05.a. EPA: 16.2). 1-16, website: http:// Yosemite.epa.gov/../503bcd6aalbd60a288256cce00070286/$ F I L E/ s o l 1_amend_consensus_0 2 2 801.PDF.

USEPA: U.S. Environmental Protection Agency (2006) "Electronic Code of Federal Regulations (e-CFR), Title 40: Protection of Environment, Part-261—Identification and listing of hazardous waste." website: http://ecfr.gpoaccess.gov/cgi/t/text-idx?c=ecfr.

Wang, Y.M. et al. (2001) "Stabilization of an elevated heavy metal contaminated site." J. Hazard. Mater. vol. 88, p. 63-74.

Wittmann, G.T.W. (1981) "Toxic metals." In : Förstner, U., Wittmann, G.T.W. (Eds) Metal Pollution in the Aquatic Environment, Springer-Verlag, New York, p. 23.

Yang, J. et al. (2001) "Lead Immobilization using phosphoric acid in a smelter-contaminated urban soil." Environ. Sci. Technol. vol. 35, pp. 3553-3559.

Yang, J.K. (2003) Factors controlling the bioaccessibility of arsenic(V) and lead (II) in soil. Soil Sediment Contam. vol. 12, pp. 165-179.

Zhang, P. and J.A. Ryan (1998) "Formation of pyromorphite in anglesite-hysdroxyapatite suspensions under varying PH conditions." Environ. Sci. Technol. vol. 32, pp. 3318-3324.

Zhang, W. (2003) "Nanoscale iron particles for environmental remediation: an overview." J. Nanopart. Res. 5, 323-332.

Paknikar, K.M. et al. (2005) "Degradation of lindane from aqueous solutions using iron sulfide nanoparticles stabilized by biopolymers," Science and Technology of Advanced Materials, pp. 370-374.

Polanams, Jup et al. (2005) "Nanophase Iron Phosphate, Iron Arsenate, Iron Vanadate, and Iron Molybdate Minerals Synthesized within the Protein Cage of Ferritin," Inorganic Chemistry, vol. 44, No. 9.

Hettiarachchi, G.M. (2004) "Soil Lead Bioavailability and in Situ Remediation of Lead-Contaminated Soils: A Review." Environmental Progress, vol. 23, No. 1.

* cited by examiner

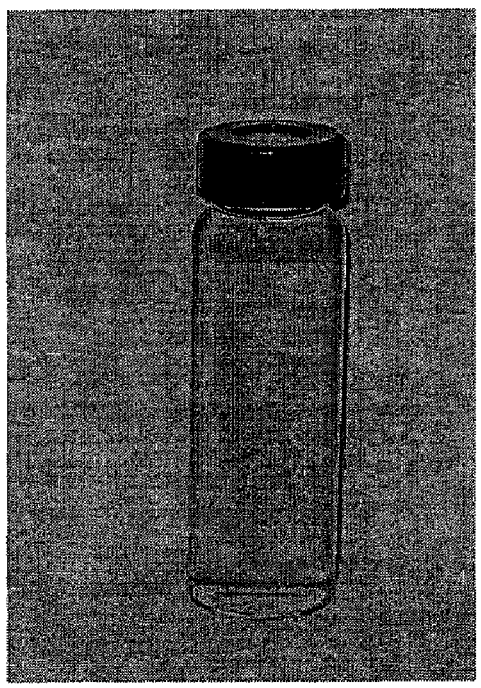
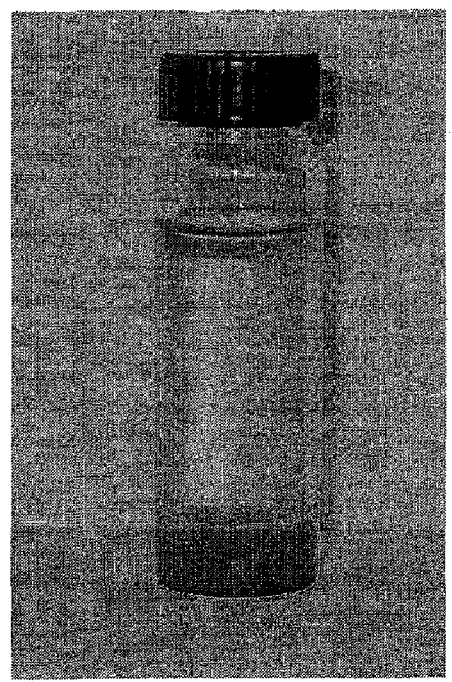
Fig. 1(a)  Fig. 1(b)
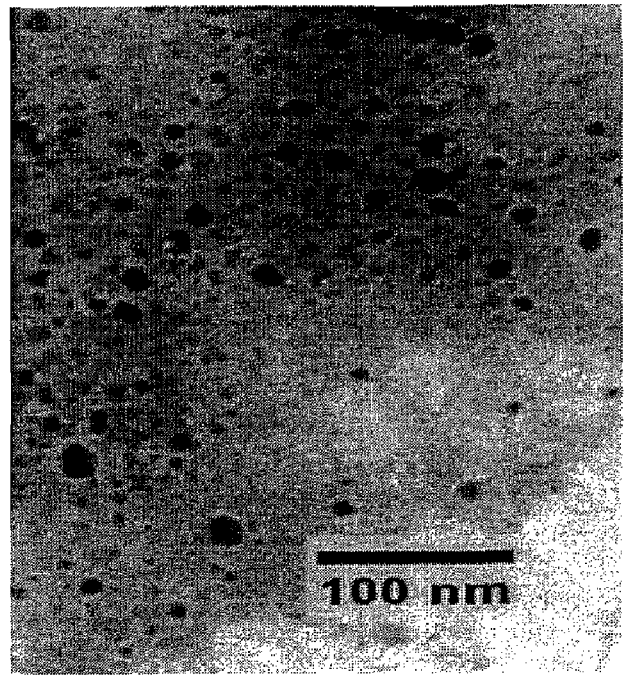
Fig. 1(c)

IN SITU IMMOBILIZATION OF METALS IN CONTAMINATED SITES USING STABILIZED IRON PHOSPHATE NANOPARTICLES

CROSS REFERENCE TO RELATED APPLICATIONS

This application claims priority from U.S. Provisional Patent Application Nos. 60/860,305, filed Nov. 21, 2006 and 60/777,309, filed Feb. 28, 2006.

BACKGROUND OF THE INVENTION

The present invention relates to mitigating the toxic effect of metals in contaminated sites, and more particularly, to using stabilized nanoparticles for the in situ immobilization and/or containment of such toxic metals in contaminated sites.

Poor material handling as well as disposal practices of toxic metal containing materials has resulted in contamination of soils, sediments and groundwater. However, these metals are also typically added to animal feeds to meet their nutritional needs, and can thus enter the environment in animal waste. The most toxic metals are the so-called "heavy metals" such as arsenic, cadmium, chromium, copper, lead, mercury, nickel and zinc.

Mercury (Hg) is one of the most pervasive and bio-accumulative contaminants. The annual global input to the atmosphere is estimated to be 5,500-6,000 metric tons, of which 50-75% result from human activities. The annual anthropogenic Hg emitted in the U.S. totals 158 metric tons, of which about 33.3% are deposited in the homeland. In addition, the global reservoir adds about 35 tons of Hg annually to the U.S. territory. About 87% of the anthropogenic Hg emission is due to combustion, and about 10% to manufacturing industries.

Mercury contamination is a growing global problem. Since the industrial revolution, Hg content in the atmosphere has increased 200 to 500%. Hg concentration in Atlantic Ocean water has been growing at 1.2 to 1.5% per year since 1970, and Hg in Atlantic sea bird feathers was found to increase at 1.1 to 4.8% per year. Based on an analysis of 97 ice-core samples from the upper Fremont glacier, Wyo., Hg deposition has increased 20 fold over the last 100 years. EPA estimated that some 200,000 tons of Hg has been emitted since 1890, of which about 95% reside in soils or sediments, about 3% in ocean surface waters, and about 2% in the atmosphere.

Traditionally, the chlorine and caustic soda (i.e., Chlor-Alkali plants) industries and the earlier use of Hg in mining were the largest Hg sources. Because of its unique properties (e.g. high density, high surface tension, liquid at room temperature, toxicity, and volatility), Hg has been used in hundreds of industrial processes. However, these unique properties have also made Hg difficult to contain and recover. In fact, significant environmental releases have been detected in virtually all uses of Hg. For example, Chlor-Alkali plants had to replace 5-10% of their Hg stocks annually, with many facilities unable to account for 50% of the annual losses. In many cases, Hg has also been used indirectly by industries, to test materials (e.g., porosimetry), to measure processes (e.g., manometers), or as functional components (e.g., switches and seals). Starting in the early 1980's, industrial consumption and releases of Hg have been greatly curtailed as a result of increasingly stringent environmental regulations. However, the past releases of Hg have left a contamination legacy that has led to continuing releases of Hg to the atmosphere and surrounding groundwater and surface water bodies.

When it enters water and sediments, Hg can undergo a number of complex chemical and biological speciation and transformation processes, of which Hg methylation has been the primary environmental concern. Methylated mercury (or methylmercury, MeHg) can accumulate along the aquatic food chain, reaching its apex in predatory fish, where concentrations may be up to one million times higher than in the water column. As a result, even small concentrations of Hg in the water column (ng/L) can lead to significant concentrations of methylmercury in fish and waterfowl.

Mercury is a potent neurotoxin. Most at risk are children and the unborn. According to the CDC, one in 12 women of childbearing age has blood mercury levels exceeding the EPA safe level for protection of the fetus, i.e. about 320,000 babies born annually in the U.S. are at risk for neuro-developmental delays. In wildlife, mercury is a productive hazard with harmful effects on a variety of species.

Triggered by the toxicity and bioaccumulation concerns, the U.S. EPA has identified Hg as one of its twelve priority persistent bio-accumulative toxins (PBTs). Meanwhile, a number of recent programs and plans have set water quality objectives for Hg in surface waters to <50 ng/L, far below the concentrations in surface waters draining most industrial facilities. As of 2003, EPA, FDA and 45 states have issued about 3089 fish consumption advisories, of which 80% are, at least in part, associated with Hg poison. Because of the heavy Hg hit, 100% of the Gulf coast line is covered by the advisories. These advisories have caused tremendous economic less in aquacultures and are continuingly hurting the growing aquacultures.

While knowledge on the biogeochemistry of Hg is still growing, there is a general consensus that there are two keys toward control of Hg poisoning: 1) reduce the source of Hg emission, and 2) minimize Hg methylation. Over the last two decades, Hg usage has been cut down dramatically in the U.S. as a result of tightened environmental regulations. However, there has been little progress in developing engineered remediation processes to control Hg methylation.

Traditionally, remediation of Hg-contaminated soils or sediments employs excavation and subsequent disposal in a landfill. However, this method is very costly and environmentally disruptive, and the landfilled Hg will very likely leach back to the environment. Recently, phytoremediation was explored to remove Hg from soils. For instance, some water hyacinths from South America were able to concentrate 4,435 ppb Hg in their roots and 852 ppb Hg in their shoots. However, this promising technology is held back by the common questions of what to do with the Hg-saturated plants, which are a hazardous waste and are subject to the RCRA. Biological conversion of methylmercury to elemental Hg was used to treat wastewater streams from Chlor Alkali plants. However, the de-methylation process is not favored in the subsurface environment.

Permeable reactive barriers (PRBs) have been employed to remediate various contaminated sites. Typically, scrap iron (i.e., Fe) is employed to in situ immobilize various redox active metals in soils and groundwater. However, because of the large particle size, the reaction kinetics if very limited. As a result, when applied to Hg immobilization, conventional PRBs have been seen to stimulate the growth of sulfate-reducing bacteria (SRB), the primary culprits of Hg methylation.

Lead is also a widespread contaminant in soils and groundwater. Lead has been ranked the second most hazardous substance in the U.S. by the Agency for Toxic Substances and Disease Registry (ATSDR) and the U.S. Environmental Protection Agency (USEPA) (ATSDR, 2005). In 1999, lead was identified as a major hazardous chemical at 47% of the 1,219 Superfund sites on the USEPA's National Priorities List (USEPA, 1999). Current remediation technologies for contaminated soil remediation are rather costly and/or often environmentally disruptive. Consequently, innovative remediation technologies for controlling lead-poisoning are urgently needed.

In recent years, in situ immobilization of $Pb^{2+}$ in contaminated soils with phosphate-based amendments has elicited a great deal of attention. This approach reduces the $Pb^{2+}$ mobility, and thus toxicity, by transforming the labile form of $Pb^{2+}$ in soils to the geochemically more stable pyromorphites ($Pb_5(PO_4)_3X$, where X=F, Cl, Br, OH) by amending contaminated soils with soluble phosphate salts or solid phosphate minerals such as apatite. Pyromorphites are considered as the most stable forms of $Pb^{2+}$ under a wide range of environmental conditions, and are over 44 orders of magnitude less soluble than other common $Pb^{2+}$ minerals in contaminated soils such as galena (PbS), anglesite ($PbSO_4$), cerussite ($PbCO_3$), and litharge (PbO). For in situ immobilization of $Pb^{2+}$ in soils, phosphate has been commonly applied to soils in its soluble forms such as phosphoric acid, $NaH_2PO_4$ or $KH_2PO_4$, or in solid forms such as synthetic apatite, natural phosphate rocks, and even fishbone (with apatite being the effective composition). Among those additives, phosphoric acid was regarded as the most effective amendment (USEPA, 2001) for its easy delivery and superior ability to dissolve $Pb^{2+}$ from existing minerals and transform it to pyromorphites. Amendment dosage of 3% $PO_4^{3-}$ by weight for soils has been proposed and applied by USEPA and other government agencies (USEPA, 2001).

However, adding large amounts (e.g. the 3% $PO_4^{3-}$ dosage) of highly soluble phosphoric acid or phosphate salts into the subsurface is limited by not only the material cost but the secondary contamination problems. Due to the high solubility of phosphate, groundwater and surface waters in the affected area may be contaminated by excessive nutrient input. To avoid phosphate leaching, solid phosphate (e.g. rock phosphate) was also studied. However, effectiveness of solid phosphate is hindered by the large size of the particles. In fact, even fine-ground solid phosphate particles are not mobile in soils, which prevents solid phosphate from being delivered to the lead-affected zone and from reaching and reacting with $Pb^{2+}$ sorbed in soils.

In recent years, environmental application of nanoscale zero-valent iron (ZVI) has attracted considerable interests. In addition to reductive dechlorination uses, ZVI nanoparticles have been studied for transformation of inorganic contaminants such as chromate ($CrO_4^{2-}$), arsenate ($AsO_4^{3-}$), perchlorate ($ClO_4^-$), and nitrate ($NO_3^-$). Compared to conventional powder or granular iron particles, nanoscale ZVI particles offer improved reactivity. However, ZVI nanoparticles can form micron-scale agglomerates rapidly, resulting in loss in soil mobility and reduced reactivity. To prevent nanoparticle agglomeration, a strategy to stabilize ZVI-nanoparticles using a low-cost and environmentally friendly cellulose (CMC) has been developed as a stabilizer. The stabilized ZVI nanoparticles displayed much improved reactivity as well as soil mobility compared to non-stabilized counterparts.

SUMMARY OF THE INVENTION

The present invention provides a method for preparing a class of highly stabilized and soil-dispersible nanoparticles and using the nanoparticles as a remediation technology for immobilizing toxic metals at toxic metal contaminated sites. The method employs a composition containing select polysaccharides (starch or cellulose) as a stabilizer for the nanoparticles in a liquid carrier, and results in suspensions of nanoparticles of desired size and mobility in water, soils or sediments. The stabilizer can facilitate controlling the dispersibility of the nanoparticles in the liquid carrier. An effective amount of the composition is delivered to a contaminated site so that the nanoparticles can immobilize one or more toxic metals of the contaminated site.

The step of delivering the nanoparticle suspension to a contaminated site preferably comprises injecting the nanoparticles into the contaminated site, which site is typically a contaminated surface or subsurface zone or location, and which may comprise soil, sediment, ground water, solid wastes, or surface water, in order to promote the immobilization of the toxic metal. The nanoparticles react with a toxic metal typically via ion exchange and/or sorption reactions to immobilize the toxic metal. Toxic metals such as arsenic, cadmium, chromium, copper, lead, mercury, nickel and zinc may be immobilized in this manner. The preferred nanoparticles are iron sulfide nanoparticles, iron phosphate nanoparticles, magnetite or other iron oxides nanoparticles, and mixtures thereof. These nanoparticles can be easily delivered, e.g. sprayed and/or injected, to surface or sub-surface contaminated sites or zones. Nanoparticles can thus be applied in situ to cap/contain a contaminated site, to build a sorptive barrier, or to in situ immobilize the toxic metals. The relatively high surface area, relatively high reactivity, and the ability to diffuse and disperse in water, soil and sediment makes the nanoparticles disclosed herein ideally suited for the present method. The metal nanoparticles typically have a particle size ranging from about 1 nm to about 200 nm.

The composition includes about >80% by weight nanoparticles, preferably >95% by weight. The composition also includes about <20% by weight stabilizer. The nanoparticles are prepared in a water solution at a concentration ranging from 0.2 to 10 g/L. The preferred stabilizers are selected from the group consisting of water soluble starch, carboxymethyl starch, thiolated starch, aminated starch, sodium carboxymethyl cellulose, carboxymethyl chitosan, and mixtures thereof.

In one preferred embodiment, the technology is particularly useful for reducing the leachability of lead in a lead contaminated soil. This method comprises the steps of providing a composition comprising iron phosphate nanoparticles dispersed in an aqueous carrier and a stabilizer to control the dispersibility of the iron phosphate nanoparticles in the carrier, and delivering an effective amount of the composition to a lead contaminated site so that the iron phosphate nanoparticles immobilize the lead in the contaminated soil. In this method, the preferred stabilizer is sodium carboxymethyl cellulose (NaCMC). Adding a chloride such as sodium chloride to the composition at a concentration from about 50 mg/L to 500 mg/L further enhances the immobilization of the lead.

In another particularly preferred embodiment, the method comprises immobilizing mercury in a mercury contaminated site. This method comprises the steps of providing a composition comprising iron sulfide nanoparticles dispersed in an aqueous carrier and a stabilizer to control the dispersibility of the iron sulfide nanoparticles in the carrier, and delivering an effective amount of the composition to a mercury contaminated site so that the iron sulfide nanoparticles immobilize the mercury in the contaminated site. In this method, the preferred stabilizer is a water-soluble starch or sodium carboxymethyl cellulose (NaCMC).

The herein described methods and compositions provide numerous advantages over traditional remediation technologies. First, the desired metal nanoparticles can be prepared with the aid of select low cost and environmentally friendly starch or cellulose as a stabilizer or capping agent. Second, the stabilized nanoparticles can be directly injected and dispersed into contaminated sites such as ground water, surface water, soils or sediments, and the size, growth rate, and dispersibility of the nanoparticles can be controlled by manipulating the types and concentration of the capping agents used. Third, amending the contaminated zone with low concentrations of nanoparticles will result in sustained immobilization of the toxic metal by forming highly stable precipitates and/or surface complexes thereon under a range of environmental conditions. Fourth, the application of the nanoparticles will not pose any harmful effect on the local environment. These and other advantages can be discerned by those skilled in this art from the description set froth herein.

BRIEF DESCRIPTION OF THE DRAWINGS

In the drawings:

FIG. 1(a) illustrates a vivianite ($Fe_3(PO_4)_2 \cdot 8H_2O$) nanoparticle suspension (1.56 mM) in the presence of 0.5% (w/w) NaCMC as a stabilizer;

FIG. 1(b) illustrates vivianite prepared following the same procedure as FIG. 2(a) except that NaCMC was absent resulting in the vivianite precipitating (1.56 mM) in the absence of a stabilizer;

FIG. 1(c) is a TEM image of CMC-stabilized vivianite nanoparticles;

DETAILED DESCRIPTION OF THE INVENTION

Figure 1:
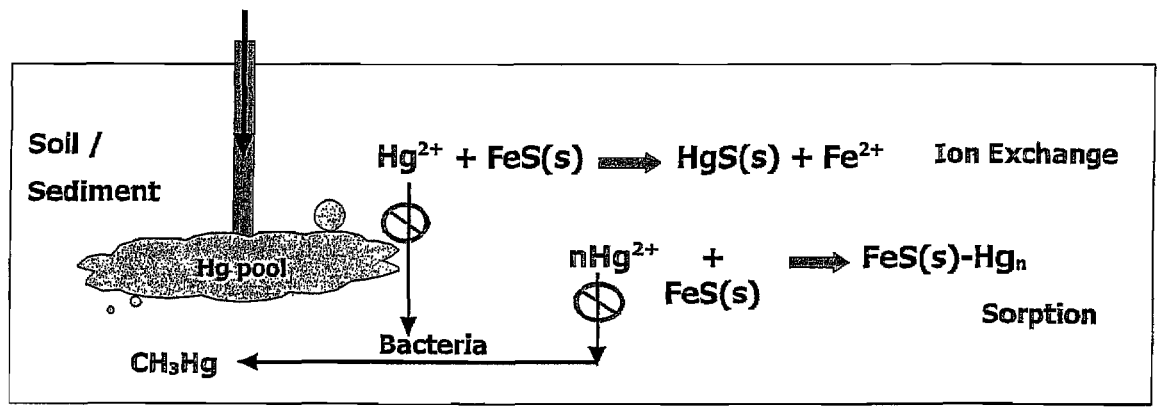
FIG. 1 is a schematic illustration of the method of immobilizing toxic metals in accordance with the present invention, particularly as it relates to immobilizing mercury with iron sulfide nanoparticles.

The present invention provides a method for preparing novel stabilized nanoparticles of controlled size and transport in porous media and a technology for immobilizing toxic metals. The technology employs nanoparticles dispersed in a liquid carrier (water) and utilizes a stabilizer or capping agent to control the dispersibility of the metal nanoparticles in the liquid carrier and in the targeted porous media (soils, sediments or solid and hazardous wastes). The nanoparticles are particularly advantageous because they have high surface area, are highly reactive with the toxic metals to be immobilized, and are readily able to be delivered in soils, sediments and water to reach the contaminated sites or zones. Thus, the nanoparticles can be easily delivered, e.g. sprayed or injected, to surface or subsurface sites of contaminated solid wastes, soils, sediments, ground water or surface water. The composition can be used in-situ to cap a site, to build a sorptive barrier, or to trap/extract the toxic metal in the solid waste, soil, sediment or water by immobilizing the toxic metal.

The preferred metal nanoparticles useful in the present invention are iron sulfide (FeS) nanoparticles, iron phosphate (vivianite) nanoparticles ($Fe_3(PO_4)_2 \cdot 8H_2O$), magnetite ($Fe_3O_4$) nanoparticles or other iron oxides nanoparticles, and mixtures thereof. Of these nanoparticles, FeS is the most preferred for mercury and lead as FeS is highly stable, extremely insoluble in water, unavailable to biota, innocuous to the environment, and extremely attractive to both mercury (Hg) and lead (Pb) ions, and iron phosphate is the most preferred for Pb.

The preparation of the nanoparticles involves a water-based approach. In general, the metal nanoparticles are prepared in three steps. The first step is to prepare a dilute aqueous solution of a stabilizer, such as a water soluble cellulose or starch containing about 0.001% to about 1.0% (w/w) of the stabilizer (preferably sodium carboxymethyl cellulose; i.e. NaCMC with a molecular weight from 5000 to 500,000) while also preparing an aqueous solution of $Fe^{2+}$ containing 0.1 to 1.0 M $Fe^{2+}$, and adjusting the pH of the solutions to between 8 and 9 with, for example, sodium hydroxide (NaOH). The $Fe^{2+}$ solution may, for example, be obtained by preparing an aqueous solution of $FeSO_4 \cdot 7H_2O$. The second step is to mix the two solutions together, and vary the stabilizer-to-Fe molar ratio and/or types of stabilizer for preparing nanoparticles of desired size and dispersibility. The third step is to add stoichiometric amounts of a sulfide solution (e.g. $Na_2S \cdot 9H_2$ if preparing FeS nanoparticles) or a phosphate solution (e.g. $NaH_2PO_4$ if preparing $Fe_3(PO_4)_2 \cdot 8H_2O$ nanoparticles) into the mixture of step 2 and allow for reaction for about 20 minutes under vacuum and at room temperature. Non-magnetic stirring should be employed during both of steps 2 and 3.

To control the dispersibility of the nanoparticles, it is often necessary to use a stabilizer/dispersant to cap the nanoparticles. For environmental remediation uses, a novel stabilizer should possess the following essential attributes: 1) it can effectively facilitate dispersion of the nanoparticles; 2) it must not cause any harmful environmental effect; 3) it will not alter the conductivity of soils or sediments, and 4) it must be cost-effective.

In accordance with the present invention, it has been discovered that select low-cost, food-grade polysaccharides (e.g. starch and cellulose) and their derivatives can act as effective and "green" stabilizers to yield nanoparticles suitable for the in-situ injection uses. Metal nanoparticles such as iron phosphate (vivianite) ($Fe_3(PO_4)_2 \cdot 8H_2$), magnetite ($Fe_3O_4$) nanoparticles and iron sulfide (FeS) nanoparticles of desired physical-chemical characteristics (size, dispersibility, mobility and Pb/Hg reactivity) can be prepared with the aid of low cost and environmentally friendly starch or cellulose as a capping agent. These novel stabilizers are either commercially available or can be easily obtained by modifying native polysaccharides. These polyhydroxylated and/or polycarboxylated macromolecules possess some novel features, which may be valuable for stabilizing nanoparticles. First, they can serve as molecular level capsules to control the agglomeration or growth rate of the resultant nanoparticles and to yield a class of nanoparticles of controlled soil/sediment mobility and dispersibility. Second, they are much cheaper than virtually all other stabilizers tested so far (e.g. cost of a water-soluble starch is 0.17-0.46 $/lb. and 2.7 $/lb for sodium carboxymethyl cellulose, NaCMC. Third, they are environmentally benign and biodegradable. Fourth, there exists a tremendous pool of starch or cellulose products covering a wide range of physical and chemical characteristics (.e.g. molecular weight, functionality), which offers great flexibility for preparing capped nanoparticles of desired characteristics.

Starch and cellulose are the most abundant polysaccharide members. As such, they are the preferred stabilizers.

The physical-chemical characteristics of nanoparticles are governed by four major factors, including a) particle size, b) surface properties, c) particle-solvent interactions, and d) particle-particle interactions. Accordingly, the present invention's strategy for preparing the "smart" nanoparticles is geared toward controlling the particle size and growth/agglomeration rate with the aid of select starch or cellulose as a capping agent or surface modifier.

Agglomeration of magnetic metal nanoparticles is a thermodynamically favorable process and can take place in a number of fashions, including a) Oswald ripening (i.e. smaller particles dissolve and are then consumed by larger particles), b) arrested precipitation (precipitation facilitated by the formation of nucleation centers), and c) direct inter-particle interactions due to van der Walls forces, magnetic and electrostatic dipolar interactions. Agglomeration increases the particle size, thereby diminishing particle mobility in soils or sediments. However, in accordance with the present invention, the rate and degree of agglomeration of nanoparticles can be well controlled with the aid of low concentrations of starch or cellulose.

A capping agent can regulate the size growth of nanoparticles through: a) electrostatic interactions (adsorption of charged stabilizer molecules to the metal core, resulting in an electrical double layer and Coulombic repulsion between capped particles), and/or b) steric stabilization (coating metal core with sterically bulky agents such as polymers impedes particle agglomeration).

The physical-chemical characteristics of the resultant nanoparticles can be affected by: a) the physical-chemical properties of the capping agents (e.g. molecular weight, structural orientation, and functionalities); b) concentration of the stabilizers (i.e., stabilizer: metal molar ratio); c) solution chemistry (pH and ionic strength); and d) temperature. For the nanoparticles of interest, solution chemistry and temperature should be compatible with the subsurface and groundwater conditions. Therefore, the greatest flexibility in preparing the desired nanoparticles comes from the diverse choices of available starch or cellulose (e.g. the molecular weight for starch/cellulose ranges from a few thousands to 1 million).

Starch and cellulose are the most abundant polysaccharide members. As such, they are the preferred stabilizers/capping agents. Water soluble starch and water soluble cellulose (NaCMC) are the most preferred capping agents for preparing the nanoparticles. However, nanoparticles having different physical-chemical properties can be obtained with the aid of different capping agents, and thus Table 10 shows a list of useful polysaccharides for use as stabilizers or capping agents.

TABLE 10

A list of polysaccharides for modifying/capping nanoparticles.

| Name | Description | Molecular Weight | Functional Group | Commerical Availability | Reported Application as a Stabilizer for |
|---|---|---|---|---|---|
| Water Soluble Starch | A complex carbohydrate $(C_6H_{10}O_5)_x$ chief storage form of carbohydrate in plants | 5,000-750,000 | —OH | Yes | Ag, iron oxide, Te, and Fe nanoparticles |
| Carboxymethyl starch | Starch with —OH groups replaced by carboxymethyl groups | 10,000-500,000 | —OH, —COO⁻ | Yes | N/A (Not available) |
| Thiolated Starch | Starch with —OH groups replaced by thiol groups | 10,000-500,000 | —OH, —SH | No | N/A |
| Aminated Starch | Starch with —OH groups replaced by quaternary amine groups | 25,000-30,000 | —OH Amine | Yes | Iron oxide nanoparticles |
| NaCMC | A gummy water soluble cellulose | 60,000-700,000 | OH, $CH_3COO^-$ | Yes | Iron oxide, Ag, Se & Fe nanoparticles |
| CM-Chitosan | Carboxymethylated chitosan (a transformed polysaccharide) | >10,000 | —NH₂, —OH, —COOO⁻ | Yes | Iron oxide nanoparticles |

The following key factors should be considered in the selection of a capping agent: a) molecular weight, size and their distribution; b) molecular structure (linear vs. globular); c) functional groups; d) degree of functionalization/substitution; e) viscosity; and f) water solubility. Molecular weight of the coating polymer plays a crucial role in stabilization of nanoparticles. For example, low-molecular-weight stabilizers may form coatings too thin to screen van der Waals forces, while high-molecular-weight stabilizers may bridge between particles to form flocs. It appears that the carboxymethyl groups in NaCMC facilitate sorption of the stabilizer to Fe(0) nanoparticles, resulting in improved stabilization.

Table 1 is not intended to be exhaustive, nor is every compound necessarily a suitable agent for all of the nanoparticles. Where comparable functional stabilizers are not commercially available, functionalization of select starch and cellulose can be carried out in a laboratory following the well-established procedures used for preparing various food-grade functionalized starch or cellulose derivatives.

Depending upon the stabilizer as well as the nanoparticle to be prepared, about 0.001% to about 1.0% by weight (w/w) of the stabilizer should be incorporated into a composition containing the nanoparticles. The preferred amounts will typically be between about 0.001% to about 0.5% (w/w), and the most preferred amounts between about 0.001% to about 0.2% (w/w).

The composition containing the nanoparticles and stabilizer will also include from about 95% to about 99.9% (w/w) of a liquid carrier in which the nanoparticles are dispersed by the stabilizer. The liquid carrier is preferably water so that the composition is an aqueous solution, but other liquids could be employed so long as the liquid carrier is compatible with the stabilizer and nanoparticles, is environmentally friendly, and is relatively inexpensive.

In one preferred embodiment, the present invention provides inhibition of Hg-methylation through in situ immobilization of Hg using stable FeS nanoparticles. Compared to traditional approaches, it is likely more environmentally friendly and may result in substantial cost cuts.

Mercury enjoys a rather complex and unique chemistry in the aquatic environment. Once deposited in solids or sediments, Hg can undergo diverse chemical and biological processes including complexation, precipitation, and biotransformation. From an environmental remediation viewpoint, the formation of methylmercury (MeHg) and formation of HgS(s) (immobilization) are of particular interests, both processes taking place primarily in the subsurface environment. While MeHg is the key Hg species that enters the food web, HgS(s) is highly stable, i.e. extremely insoluble in water and unavailable to biota. Under anaerobic conditions, Hg is methylated through sulfate reducing bacteria (SRB), i.e.

$$Hg^{2+} + \text{sulfate reducing bacteria} \rightarrow \text{MeHg (undesired)} \qquad (1)$$

On the other hand, as sulfate is reduced to sulfide by the same bacteria, the desirable reaction will take place competitively $$Hg^{2+} + S^{2-} \rightarrow HgS(s) \text{ (desired!)} \qquad (2)$$

Since both reactions are mediated by SRB, one would not rely on SRB for immobilizing Hg. However, it is possible to promote reaction (2) and simultaneously inhibit reaction (1) by abiotic means such as addition of innocuous sulfide minerals. The resultant HgS(s) can be either metacinnabar (cubic, black HgS(s)) or the thermodynamically more stable cinnabar (hexagonal, red HgS(s)). Both forms of HgS(s) are extremely insoluble in water. In the absence of dissolved oxygen (DO), dissolution of HgS(s) is thermodynamically unfavorable, as revealed by the extremely small equilibrium constant K in equation (3)

$$HgS + 2H_2O \leftrightarrow Hg(OH)_2^0 + H_2S \quad K = 10^{-38} \qquad (3)$$

In the presence of DO, the HgS(s) dissolution turns to thermodynamically favorable. However, HgS(s) dissolution is then limited by extremely slow oxidation kinetics. Namely, once formed, HgS(s) may remain stable in the environment, even under oxidizing conditions.

Therefore, engineered promotion of HgS(s) formation will greatly decrease the bioavailability of Hg, and thereby inhibit the Hg methylation. In fact, the formation of HgS(s) and subsequent deposition into soils and sediments is considered the dominant sink for Hg from the global Hg cycle.

To this end, the present invention provides a new class of highly Hg-specific FeS nanoparticles that can be injected and well dispersed in soils or sediments to promote abiotic immobilization of Hg. Because of the greater Hg-reactivity and much faster reaction kinetics over biological processes, the nanoparticles result in rapid immobilization of Hg, thereby inhibiting or eliminating methylation of Hg. FIG. 1 depicts the concept of this technology, wherein Hg precipitation and sorption to inhibit Hg methylation is promoted by injecting stabilized FeS nanoparticles into contaminated soils/sediments. Both ion exchange and sorption can result in highly stable mercury sulfide precipitates or surface complexes. The dispersion of FeS nanoparticles can be controlled by use of a starch or cellulose stabilizer. In a few days/weeks the nanoparticles will agglomerate and grow to larger flocs (up to sub-mm) or be sorbed to soils/sediment surfaces, losing their mobility but continuing to offer prolonged Hg immobilization capacity.

EXAMPLE 1

1. Introduction
  1.1 Objectives

The overall goal of this experiment is to prepare and test a new class of CMC-stabilized iron phosphate nanoparticles for immobilizing $Pb^{2+}$ in soils and/or solid and hazardous wastes. The specific objectives are to: 1) prepare a new class of iron phosphate nanoparticles with CMC as a stabilizer; 2) test effectiveness of the nanoparticles for reducing the leachability of $Pb^{2+}$ in three representative soils; and 3) determine effects of soil type, treatment contact time (aging), and chloride on $Pb^{2+}$ immobilization efficiency; and 4) probe speciation of soil-bound $Pb^{2+}$ before and after the nanoparticle amendment.

1.2 Brief Summary of Results

A new class of iron phosphate (vivianite) nanoparticles synthesized with sodium carboxymethyl cellulose (CMC) as a stabilizer for in situ immobilization of lead ($Pb^{2+}$) in soils was prepared and tested. Batch test results showed that the CMC-stabilized nanoparticles can effectively reduce the TCLP (toxicity characteristic leaching procedure) leachability and PBET (physiologically based extraction test) bioaccessibility of $Pb^{2+}$ in three representative soils (calcareous, neutral, and acidic). When the soils were treated for 56 days at a dosage ranging from 0.61 to 3.0 mg/g-soil as $PO_4^{3-}$, the TCLP leachability of $Pb^{2+}$ was reduced by 85 to 95%, whereas the bioaccessibility was lowered by 31 to 47%. Results from a sequential extraction procedure showed a 33 to 93% decrease of exchangeable $Pb^{2+}$ and carbonate-bound fractions, and an increase in residual-$Pb^{2+}$ fraction when Pb-spiked soils were amended with the nanoparticles. Addition of chloride in the treatment further decreased the TCLP leachable $Pb^{2+}$ in soils, suggesting the formation of chloro-pyromorphite minerals. Compared to soluble phosphate used for in situ metal immobilization, application of the iron phosphate nanoparticles results in about 50% reduction in phosphate leaching into the environment.

2. Materials and Methods
  2.1 Materials

All chemicals used in this study were of analytical or higher grade. The sodium form of carboxymethyl cellulose (molecular weight=90,000), iron sulfate heptahydrate ($FeSO_4 \cdot 8H_2O$) and sodium chloride (NaCl) were purchased from Acros Organics, (Morris Plains, N.J., USA), all other chemicals were purchased from Fisher Scientific (Pittsburgh, Pa., USA). All solutions were prepared with deionized water (18 MΩ-cm) from a Milli-QTM Water System.

Three top soils (up to about 25 cm) designated as acidic, neutral and calcareous soils (or AS, NS, and CS, respectively) based on the soil pH were collected from a farm in western Alabama, USA. Table 1 gives salient physical and chemical properties for the soil samples. Before use, the soils were air-dried and passed through a 2-mm sieve. Soil pH was measured in 0.01 $MCaCl_2$ in a 1:1 soil: solution (g:mL) suspension (Thomas, 1996). Elemental analysis of the soils was conducted following EPA method 3050B and using an inductively coupled plasma optical emission spectrometer (Vista-MPX, Varian Inc., Palo Alto, Calif., USA). The content of sand, silt and clay was determined following the pipette method (Gee and Or, 2002). Total nitrogen and total carbon were analyzed following the Dumas method with a LECO CN-2000 combustion unit (LECO Corp., Joseph, Mich., USA) at 1050° C., and organic carbon was measured using the same method except that soils were treated with 4 N $H_2SO_4$ to dissolve free carbonates before the dry combustion. The content of carbonates was then calculated from the difference between total carbon and organic carbon. Soil sulfur content was determined using a LECO SC-432 sulfur analyzer (LECO Corp., Joseph, Mich., USA). Soil clay minerals were analyzed with an X-ray diffraction unit (Siemens D5000 X-ray diffractometer) after the soil samples were treated following the procedure by Kunze and Dixon (1986). The content of each clay mineral was estimated by the respective intensity of diffracted X-ray. The cation exchange capacity (CEC) was determined with 1 N $NH_4OAc$ buffered at pH 7.0 following the method described in the Soil Survey Laboratory Methods Manual (USDA et al., 1996).

2.2 Soil Spiking with $Pb^{2+}$

The three soils were first spiked with known concentrations of $Pb^{2+}$ following the procedure described by Yang et al. (2003). In brief, a known mass of an air-dried soil was mixed with a solution containing about 70 mg/L Pb and $10^{-3}$ M $CaCl_2$ and at a solution-to-solid ratio of 10:1 (mL/g) and at an initial pH 5.50. After mixing for 96 h, the mixture was centrifuged and supernatant decanted. The Pb-loaded soil was then washed twice with deionized water to remove water-soluble $Pb^{2+}$. The decanted supernatant and rinse water were filtered through 0.45-μm membrane filter, and analyzed for Pb using an atomic absorption spectrophotometer. The final $Pb^{2+}$ uptake by each soil was calculated by mass balance calculations. The resultant $Pb^{2+}$ uptake was 599 mg/kg for CS, 696 mg/kg for NS, and 640 mg/kg for AS, all of which were above the EPA action level of 400 mg/kg. These numbers were further verified with USEPA Method 3050B (1996), and the difference was <5% in all cases. The Pb-loaded soils were then air-dried for subsequent experimental uses.

2.3 Preparation of CMC-Stabilized Iron Phosphate Nanoparticles

A 1% (w/w) CMC solution, a 1.05 g/L $PO_4^{3-}$ solution, and a 1.19 g/L $Fe^{2+}$ solution were prepared separately and then purged with nitrogen gas for about 4 hours to remove dissolved oxygen (DO). The nanoparticle preparation was then carried out in an anaerobic chamber (Model 10, Sheldon Manufacturing Inc., Oregon, USA), where 25 mL of the $Fe^{2+}$ solution was dropwise added to 50 mL of the 1% CMC solution under mixing. After the mixture was stirred for 30 min, 25 mL of the phosphate solution was added to the mixture dropwise and under mixing. The molar ratio of $Fe^{2+}$-to-$PO_4^{3-}$ was 3:2 in accord with the stoichiometry given in Eqn (1), through which the $Fe_3(PO_4)_2 \cdot 8H_2O$ (vivianite) nanoparticles are formed,

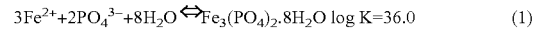

$$3Fe^{2+} + 2PO_4^{3-} + 8H_2O \Leftrightarrow Fe_3(PO_4)_2 \cdot 8H_2O \quad \log K = 36.0 \qquad (1)$$

The final pH of the resultant nanoparticle suspension was measured to be 6.56, and the resultant nanoparticle suspension included: 0.5% CMC, 4.7 mM or 263 mg/L Fe and 3.1 mM or 298 mg/L $PO_4^{3-}$.

For TEM imaging, a drop of the vivianite nanoparticle suspension was placed on a carbon coated copper grid and then dried for 12 hours in the anaerobic chamber. The dried grid was then placed under a JEOL JEM-200CX transmission electron microscope. The images were taken at an acceleration voltage of 120 kV. The size of the stabilized nanoparticles was determined by measuring the size of a total of 450 nanoparticles from five representative TEM images. 2.4 Soil treatment with $Fe_3(PO_4)_2$ nanoparticles Each Pb-spiked soil sample was amended by mixing 0.5 g (dry weight) of a soil with 1 mL of the nanoparticle suspension in 15 mL centrifuging tubes with screw caps, which resulted in a suspension-to-soil ratio of 2:1 (mL/g). The mixtures were sealed and shaken for 5 min, and then placed still in the hood at room temperature (21±2° C.) for aging. For comparison, the same amendment procedure was also conducted at a higher suspension-to-soil ratio of 10:1 (mL/g). For typographical convenience, the treatment at a suspension-to-soil ratio of 2:1 is denoted as Case 1, and that at 10:1 as Case 2. For the three soils, the Phosphate-to-Pb molar ratio ranged from 1.8 to 2.2 for Case 1, and from 9 to 11 for Case 2. To test the effect of contact/reaction time on Pb-immobilization, the soil-nanoparticle contact time was varied from 1 to 56 days. To ensure data quality, all soil treatment tests were performed in duplicates.

To determine the effect of chloride on $Pb^{2+}$ immobilization, additional tests were carried out following the same experimental protocol but in the presence of 100 mg/L and 300 mg/L $Cl^-$ (added as NaCl), respectively. The reaction time for these tests was set for 1 week.

Additionally, parallel experiments were conducted to compare the phosphate leachability when the soils were amended with the nanoparticle suspension or a soluble phosphate salt (300 mg/L $PO_4^{3-}$ solution as $NaH_2PO_4$ at pH 6.7) following the same treatment procedures. The reaction time was set for 1 week for these tests. The phosphate concentrations in the supernatants were measured using a DX-120 Ion Chromatograph (Dionex Corporation, CA, USA) after the soil slurries were centrifuged at 3000×g for 10 min.

2.5 TCLP Tests

TCLP tests were performed to quantify the $Pb^{2+}$ leachability of the untreated and the nanoparticle-amended soils following EPA Method 1311 (USEPA, 1992). The TCLP fluid consisted of 0.1 M glacial acetic acid and 0.0643 M NaOH, which resulted in a pH of 4.93. At predetermined aging times, the soil-nanoparticle mixtures were centrifuged at 3000×g for 10 min. Upon decanting the supernatant, 10 mL of the TCLP fluid was added to each tube containing the treated soils. The mixture was then agitated on a shaker for 18 h at 21±2° C. and then centrifuged at 3000×g for 10 min. The supernatant was then passed through a 0.45 µm Ampore-size polycarbonate filter. The filtrate was then acidified using 1% $HNO_3$, and analyzed for Pb. For comparison, the same TCLP tests were also carried out on the untreated Pb-spiked soils. All tests were duplicated. The TCLP leachability of Pb was quantified via Eqn (2), $$\text{Leachability of } Pb \text{ in soil} = \frac{(C_{TCLP,Pb}, \text{mg/L})(0.01 \text{ L})}{(Q_{Pb}, \text{mg/g})(0.5 \text{ g})} \times 100\% \quad (2)$$

where $C_{TCLP,Pb}$ is the Pb concentration in the TCLP extract and $Q_{Pb}$ is the Pb content in the soil sample before the TCLP treatment. To assure mass balance, the TCLP-extracted soil residues were further extracted and analyzed for residual Pb following EPA Method 3050B.

2.6 PBET Tests

In addition to the TCLP tests, a biochemically oriented method, PBET, was employed to evaluate the in vitro bioaccessibility of soil-sorbed Pb (Ruby et al., 1996; 1999). PBET employs an extraction solution of 30 g/L glycine (0.4 M) with a pH adjusted to about 2.3 with $HNO_3$ to mimic the conditions in the gastric system and small intestines. PBET tests were conducted following the procedures described by Kelley et al. (2002). Typically, 0.1 g of an air-dried soil sample (untreated or nanoparticle treated) was mixed with 10 mL of the extracting liquid in 15 mL high-density polyethylene vials. The mixtures were then mixed on an end-to-end rotator placed in an incubator at 37° C. After 1 h, the vials were centrifuged at 3000×g for 10 min, supernatant filtered with 0.45-µm membrane filters, and then filtrate analyzed for $Pb^{2+}$ with an atomic absorption spectrophotometer. The bioaccessibility of $Pb^{2+}$ was quantified by $$\text{Bioaccessibility of } Pb(\%) = \frac{(C_{PBET,Pb}, \text{mg/L})(0.01 \text{ L})}{(Q_{Pb}, \text{mg/g})(0.1 \text{ g})} \times 100 \quad (3)$$

where $C_{PBET,Pb}$ is the Pb concentration in the PBET solution and $Q_{Pb}$ is the Pb content in the soil sample before the PBET extraction. All tests were triplicated to ensure data quality.

2.7 Sequential Extraction of Soil-Sorbed $Pb^{2+}$

To probe the change in Pb speciation in the soils before and after the nanoparticle treatment, a sequential extraction procedure developed by Tessier et al. (1979) and then modified by others (Shuman, 1985; Han et. al 2001; Peltier, 2005) was employed to quantify the relative availability of $Pb^{2+}$ based on fractions of various operationally defined $Pb^{2+}$ species. Table 2 shows the reagents and procedures used for each of the five sequential extraction steps. For each step, a given volume of a prescribed extractant was mixed with a soil sample (equivalent to 0.5 g dry weight) in a 15 mL Teflon centrifuge tube. At predetermined times (Table 2), the mixtures were centrifuged at 3000×g for 10 min. The supernatant was decanted, filtered through a 0.45-µm membrane filter, and then filtrate analyzed for Pb. All tests were carried out in an anaerobic atmosphere to mimic the subsurface redox condition. All extractions were duplicated to assure data quality.

3. Results and Discussion 3.1 Characterization of Iron Phosphate Nanoparticles

FIG. 1a shows the suspension of the vivianite nanoparticle suspension in the presence of 0.5% (w/w) CMC. For comparison, FIG. 1b shows the vivianite prepared following the same procure except that CMC was absent. While the CMC-stabilized vivianite nanoparticles remain fully suspended and the suspension appeared as a transparent solution for weeks, the non-stabilized counterparts agglomerated and precipitated in minutes. FIG. 1c shows a representative TEM image of the CMC-stabilized vivianite nanoparticles (nitrogen-dried), which reveals that the particles were present as discrete nanoparticles. Based on 450 particles from five similar TEM images, the mean size of the iron phosphate nanoparticles was estimated to be 8.4±2.9 nm (standard deviation). Evidently, the presence of CMC effectively prevented the vivianite nanoparticles from agglomerating. Preliminary column tests with the acidic soil showed that the stabilized nanoparticles can easily pass the soil bed under gravity, while the agglomerated vivianite flocs were completely caught on top of the soil bed. The great soil mobility enables the nanoparticles to be delivered to targeted contaminant source zones in the subsurface (i.e. applied in situ) and to access to and react with soil-sorbed $Pb^{2+}$ ions.

Earlier, Si et al. (2004) and He et al. (2006) attributed the nanoparticle stabilization by poly-electrolytes to encapsulation of the nanoparticles with a thin layer of negative charges from the stabilizer such as CMC. They also reported that the size of the nanoparticles can be controlled by varying the concentration of a polyelectrolyte. In addition, Kim et al. (2003) claimed that the formation of a polymer layer on the surface of magnetite nanoparticles may prevent oxidation of the nanoparticles.

The solubility product value for vivianite was reported to be about $10^{-36}$ (Nriagu, 1972). Therefore, dissolution of vivianite is thermodynamically rather unfavorable. Ignoring the influence of CMC in the nanoparticle suspension on the dissolution, Visual MINTEQ (Version 2.32) calculations showed that the equilibrium aqueous concentrations of $Fe^{2+}$ (the predominant aqueous form of Fe) and total P (predominantly in $H_2PO_4^-$ at pH 6.56) in the nanoparticle suspension were 0.027 mM and 0.015 mM, respectively, i.e. >99.4% of $Fe^{2+}$ and phosphate added to the solution were converted to vivianite precipitates during the nanoparticle synthesis.

3.2 TCLP Leachability of Soil-Bound $Pb^{2+}$

Figure 2A:
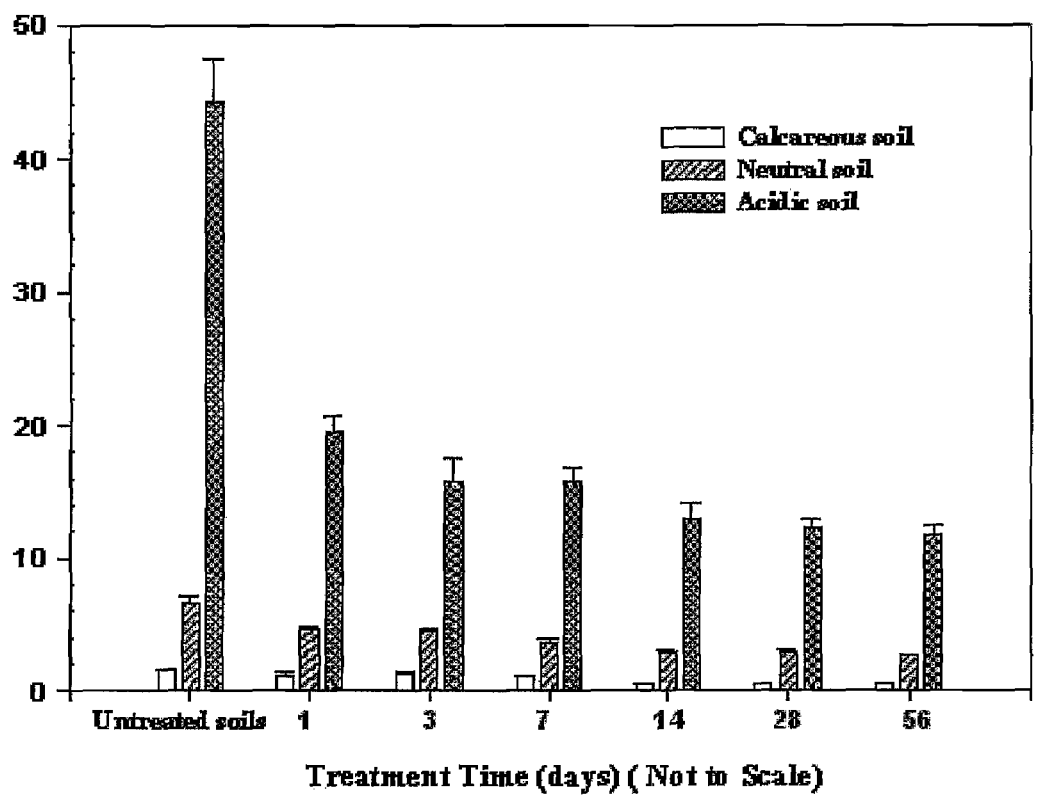
FIG. 2(a) is a graph illustrating the reduction of TCLP-based leachability of soil-bound Pb with treatment time when soils were amended with 1.56 mM of CMC-stabilized vivianite nanoparticle suspension, and a suspensionto-soil ratio equal to 2:1 (mUg) (Case 1)

To test the effectiveness of the CMC-stabilized vivianite nanoparticles for enhancing $Pb^{2+}$ immobilization, the TCLP leachability of $Pb^{2+}$ in untreated and nanoparticle-amended soils was measured and compared. FIG. 2 shows the TCLP leachability of soil-sorbed $Pb^{2+}$ for the three soils before and after the soils were treated with the nanoparticles under Case 1 (a) and Case 2 (b) conditions and at various treatment times. As usually is the case, the acidic soil displayed the greatest $Pb^{2+}$ leachability (about 44% for the untreated soil) than the other two soils (about 6.6% for the neutral soil and about 1.5% for the calcareous soil). When the soils were amended with the vivianite nanoparticle suspension for 1 day in Case 1 (FIG. 2a), the $Pb^{2+}$ leachability for the acidic soil was decreased from its original 44% to 20%, i.e. a 56% reduction. The $Pb^{2+}$ leachability was further reduced as the contact time was increased for all cases. For example, the leachability in the acidic soil was lowered to about 15% after 14 days of aging in Case 1. However, after 14 days, the aging effect became less conspicuous. For the acidic soil, the leachability from the $14^{th}$ to 56th day was reduced by only 1%, resulting in a 74% of overall reduction in $Pb^{2+}$ leachability in Case 1. From the standpoint of nanoparticle mass transfer and reaction kinetics, the observation revealed that the $Pb^{2+}$ immobilization was kinetically most effective within one day and equilibrium was nearly reached in 14 days.

For the neutral soil in Case 1 (FIG. 2a), the 1 day-treatment lowered the leachability from 6.6% to 4.6% (i.e. a 30% reduction). The leachability was further reduced to 2.8% after 14 days of treatment. The leachability for the untreated calcareous soil was quite low (about 1.5%), which nonetheless was lowered to 0.5% after 14 days of treatment (a 65% reduction) although the Pb content in this soil was comparable to that for the other two soils.

The calcareous soil contained a much higher level (48.5%) of carbonates than the other two soils (Table 1), which granted the calcareous soil a much greater alkalinity. Consequently, the final pH of the TCLP extracts was 6.0 to 6.5 for CS, 5.1 to 5.5 for NS and 4.8 to 5.0 for AS although all the TCLP tests were carried out under identical conditions and the initial TCLP fluid pH was 4.9. As a result, the extracting power of the TCLP fluid was diminished by the elevated pH so that the TCLP leachability of $Pb^{2+}$ in the calcareous soil was much lower than that in the neutral or acidic soils although the three soils contained comparable amounts of Pb. Accordingly, after those soils were amended with the nanoparticles, the reduction of the $Pb^{2+}$ leachability was much more distinctive for the acidic soil (56% reduction in 1 day amendment) than for the neutral (30% reduction in 1 day) and the calcareous soil (26% reduction in 1 day). This observation also suggested that the nanoparticle treatment is likely more suitable for immobilizing $Pb^{2+}$ sorbed in acidic soils. The Pb concentration in the TCLP fluid for the untreated acidic soil was nearly three times the EPA TCLP limit of 5 mg/L for identifying hazardous wastes (USEPA, 2006). Upon the nanoparticle treatment, the Pb concentration in the TCLP extracts was reduced to 3.7 mg/L.

Figure 2B:
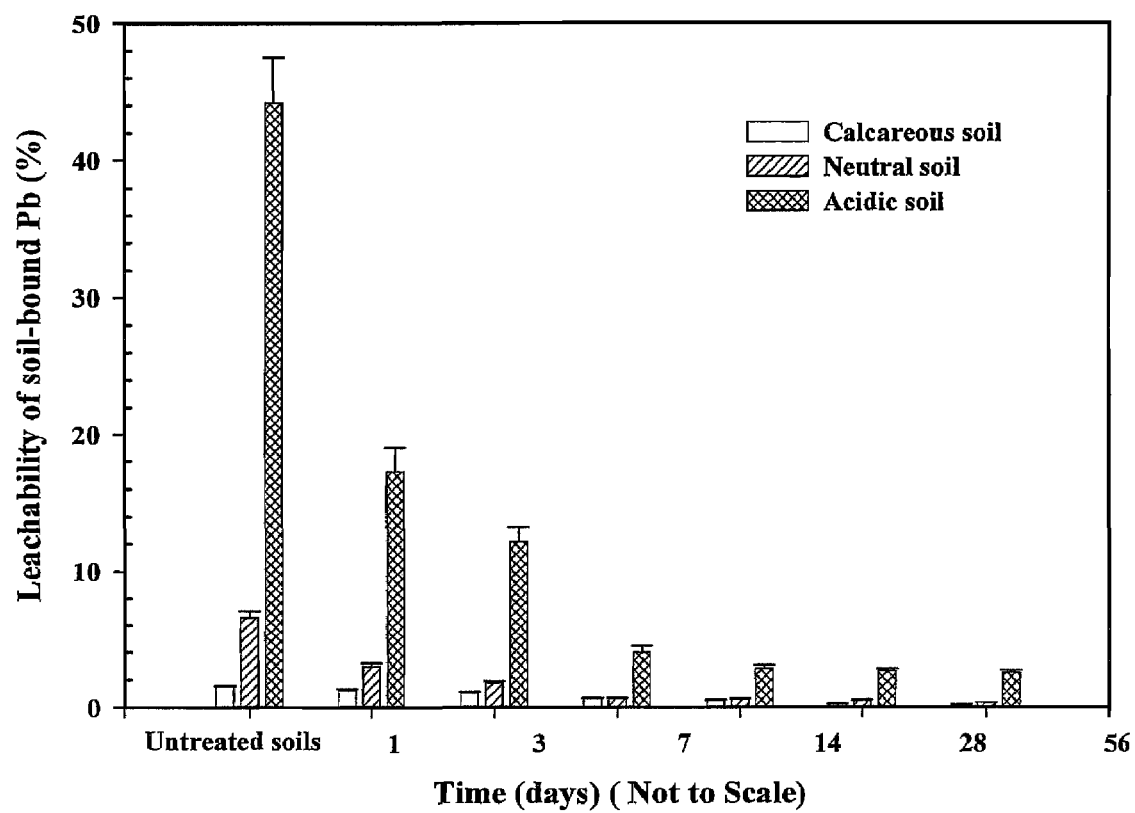
FIG. 2 (b) is a graph similar to FIG. 2(a) except the suspension-to-soil ratio is 10:1 (mL/g) (Case 2)

FIG. 2b shows that much greater reduction in Pb leachability was achieved when the soils were treated in Case 2, where a five times greater volume of the nanoparticle suspension was used to amend the soils (i.e. vivianite:Pb molar ratio=8.6:1). Again, after two weeks of the treatment, the leaching equilibrium was reached and Pb leachability was decreased by 94%, 95% and 70%, for the AS, NS and CS, respectively. In this case, Pb in the TCLP extracts was reduced to about 0.12±0.01 mg/L for NS, 0.06±0.01 mg/L for CS, and 0.80±0.05 mg/L after 56-day reaction time.

Laperche et al. (1996) reacted hydroxyapatite with litharge/massicot (PbO) and cerussite ($PbCO_3$) in the pH range 5-8 for 2 days and found that the formation of hydroxypyromorphite was faster at the lower end pH of 5. The researchers also claimed that at pH<8, hydroxypyromorphite formation appeared to be limited by kinetic rather than thermodynamic constraints. Ma and Rao (1999) found that phosphate rocks were less effective at higher soil pH for $Pb^{2+}$ immobilization. Ryan et al. (2001) and Yang et al. (2001) asserted that dissolution of soil-sorbed $Pb^{2+}$ is the rate-limiting step for formation of pyromorphite-like minerals when sufficient soluble phosphate is provided. Apparently, when solid phosphate (e.g. rock phosphate) is used, dissolution of the phosphate source is also important. Since lower pH favors dissolution of both $Pb^{2+}$ and phosphate, improved $Pb^{2+}$ immobilization is expected at a lower pH. Thus, the observed rapid and substantial reduction in the TCLP leachability for the acidic soil (FIG. 2) is attributed to the relatively easy availability of soil-sorbed $Pb^{2+}$ and the lower soil pH. In contrast, the immobilization rate for NS (pH=6.93) and especially CS (pH=7.85) was a relatively slower process, and thus, was not as effective as for AS.

The fact that the equilibrium was nearly reached in ~14 days also revealed that the nanoparticles provide a relatively easily available source of phosphate for $Pb^{2+}$ immobilization. Compared to macron-scale or granular phosphate sources, the nanoparticles offer much greater soil mobility and greater reactivity toward soil-sorbed $Pb^{2+}$. Chen et al. (2005) studied the effect of grain size of rock phosphate on $Pb^{2+}$ immobilization in various contaminated soils, and concluded that the rock phosphate with small grain size (<35 μm) performed much better than with larger grain size. Stanforth and Qiu (2001) reported that high dosages of solid phosphate such as hydroxyapatite ($Ca_5(PO_4)_3(OH)$) or rock phosphate were not effective for reducing the TCLP leachable Pb to <0.75 mg/L, which is the targeted level of Pb in treating Pb-laden hazardous waste, due to the slow dissolution of the phosphate minerals.

To enhance phosphate availability, various soluble phosphate sources have been tested for immobilization of Pb in soils. Theodoratos et al. (2002) studied calcium monobasic phosphate ($Ca(H_2PO_4)_2.H_2O$) for heavy metals immobilization in soils, and observed that TCLP-leachable $Pb^{2+}$ was reduced by 87% by applying >7% (w/w) $PO_4^{3-}$ to soil samples for 2 month. Wang et al. (2001) reported that a combination of 6.25% Ca(H$_2$PO$_4$)$_2$.H$_2$O (4.7% as PO$_4^{3-}$) and 6.25% CaCO$_3$ was able to decrease TCLP-leachable Pb$^{2+}$ by 99% in a surface soil. Evidently, these soluble phosphate sources were able to offer comparable reduction of Pb$^{2+}$ leachability to that with the nanoparticles. However, the reported treatment dosage of these soluble phosphate sources was typically more than one order of magnitude greater. In addition, application of large quantities of soluble phosphate is critically restricted by the subsequent release of excessive amounts of phosphate in the affected environment.

Evidently, for effective immobilization of Pb$^{2+}$ in soils, an amending agent must be kinetically easily available, and yet, any release of excessive phosphate should be minimized. Compared to macro-scale phosphate source materials, the stabilized nanoparticles offer not only much improved soil mobility (i.e. they can be much more easily delivered to the targeted locations), but also much faster reaction kinetics. Compared to soluble phosphate sources, the stabilized nanoparticles offer better controlled kinetics to sustain a sound formation rate of pyromorphite, yet result in much reduced phosphate leaching as to be shown in Section 3.6.

3.3 Bioaccessibility of Soil-Bound Pb$^{2+}$

Figure 3:
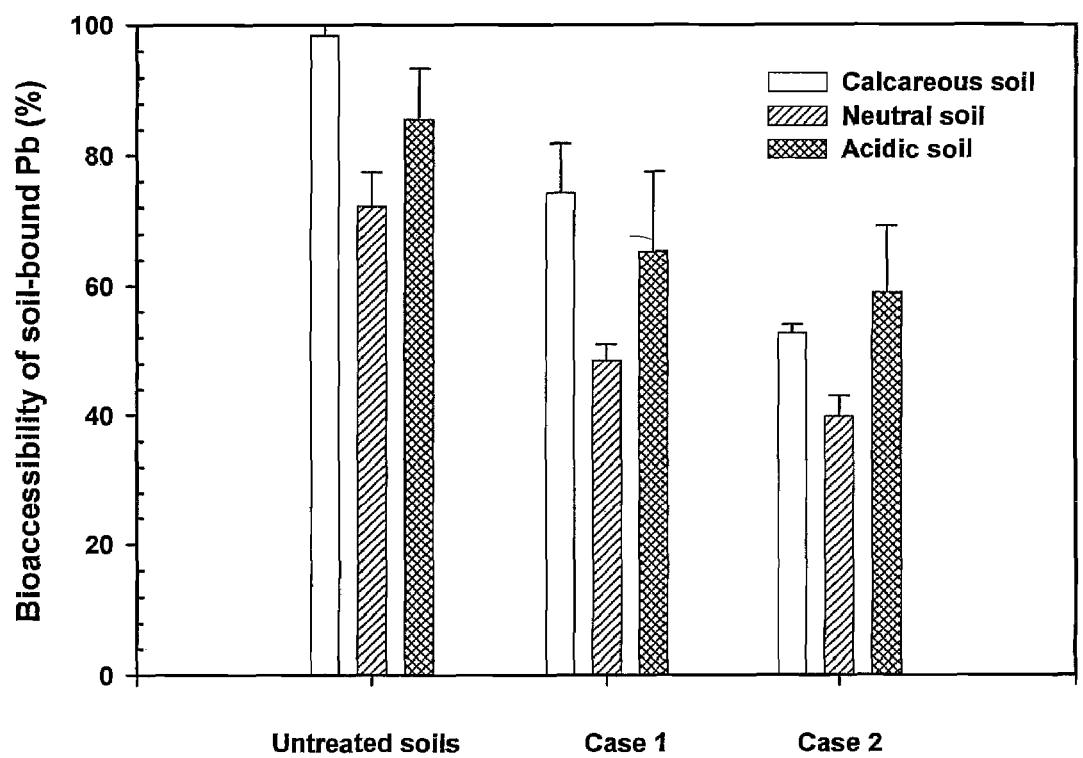
FIG. 3 is a graph illustrating reduction of PBET-based bioaccessability of soil-bound Pb when soils were amended with 1.56 mM of vivianite nanoparticles for 56 days at the two does of nanoparticles (Case 1 and Case 2)

In vitro bioaccessibility of soil-bound Pb$^{2+}$ has been evaluated by several authors using the PBET method, in which a much harsher solution of pH 2.3 and at a much higher liquid-to-soil ratio (100:1) are employed to simulate the gastrointestinal conditions. FIG. 3 shows the PBET-based bioaccessibility of Pb$^{2+}$ in the three soils, which were either untreated or treated for 56 days at the two doses of the nanoparticles. First of all, it was interesting that under the harsh PBET conditions, the Pb bioaccessibility for all three untreated soils ranged from 72% for NS to 98% for CS and followed a sequence of CS>AS>NS, which differed markedly from that for the TCLP leachability (FIG. 2). This observation agrees with the study by Ruby et al. (1999), who stated that Pb-laden mineral phases formed under acidic conditions tend to be more stable in the acidic conditions of the stomach and hence less bioaccessible than mineral phases formed under alkaline conditions. In fact, Pb$^{2+}$ in calcareous soils is predominantly present in the form of PbCO$_3$ (Doner and Grossi, 2002), which will resist leaching by moderately acidic solutions such as the TCLP liquid due to the greater acid buffering capacity. However, under PBET conditions, the soil buffer capacity is exhausted, and as carbonate is dissolved, Pb$^{2+}$ is released. In contrast, for acidic soils, Pb$^{2+}$ is typically sorbed by iron/manganese oxides, organic matter, and clay minerals or even in pyromorphite form (Buatier et al., 2001), all of which are less available than the carbonate-bound form.

FIG. 3 shows that about 14% of pre-loaded Pb in original AS was not bioaccessible. However, the bioaccessibility of Pb was effectively lowered when the soils were treated with the nanoparticles for 56 days. In Case 1, the bioaccessibility was reduced by 25% for CS, 33% for NS, and 21% for AS. When the dose was increased 5 times (Case 2), the bioaccessibility was reduced by 47% for CS, 45% for NS, and 31% for AS compared to the untreated soils. Yang et al. (2001) reported that bioaccessible Pb in a smelter-contaminated soil (soil pH=7.1) was reduced by 60% after the soil was amended for 70 days with H$_3$PO$_4$ at 10 mg-P/g-soil, which was over 3 times greater than the highest dose used in our case. The Pb concentration in the PBET extracts was (mg/L) 5.50±0.09 for CS, 5.02±0.37 for NS and 5.47±0.50 for AS, which was reduced to 2.93±0.08, 2.76±0.22, and 3.76±0.66, respectively.

3.4 Formation of Chloro-Pyromorphite and Effect of Chloride

A number of researchers have reported direct evidence for the formation of pyromorphites in phosphate-amended Pb-contaminated soils through X-ray diffraction (XRD), scanning electron microscopy (SEM), atomic force microscopy (AFM), and extended X-ray absorption fine structure spectroscopy (EXAFS) measurements (Laperche et al., 1996; Lower et al., 1998; Traina and Laperche, 1999; Ryan et al., 2001; Cao et al, 2002). Based on work by others (Lindsay, 1979; Laperche et al., 1996; Yang et al., 2001), the following reaction stoichiometry is considered to be responsible for the enhanced Pb$^{2+}$ immobilization when the soils are treated with vivianite nanoparticles under acidic conditions:

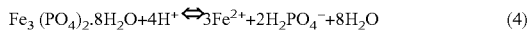

$$\text{Fe}_3(\text{PO}_4)_2 \cdot 8\text{H}_2\text{O} + 4\text{H}^+ \rightleftharpoons 3\text{Fe}^{2+} + 2\text{H}_2\text{PO}_4^- + 8\text{H}_2\text{O} \quad (4)$$

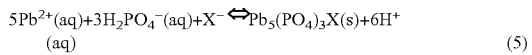

$$5\text{Pb}^{2+}(\text{aq}) + 3\text{H}_2\text{PO}_4^-(\text{aq}) + \text{X}^- \rightleftharpoons \text{Pb}_5(\text{PO}_4)_3\text{X}(s) + 6\text{H}^+(\text{aq}) \quad (5)$$

where X$^-$=F$^-$, Cl$^-$, BrF$^-$ or OH$^-$.

At pH>7.20, the following reactions become predominant pathways:

$$\text{Fe}_3(\text{PO}_4)_2 \cdot 8\text{H}_2\text{O} + 2\text{H}^+ \rightleftharpoons 3\text{Fe}^{2+} + 2\text{HPO}_4^{2-} + 8\text{H}_2\text{O} \quad (6)$$

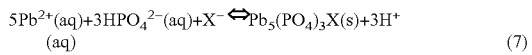

$$5\text{Pb}^{2+}(\text{aq}) + 3\text{HPO}_4^{2-}(\text{aq}) + \text{X}^- \rightleftharpoons \text{Pb}_5(\text{PO}_4)_3\text{X}(s) + 3\text{H}^+(\text{aq}) \quad (7)$$

The solubility product value (K$_{sp}$) for vivianite is 10$^{-36}$. However, the K$_{sp}$ value for chloro-, bromo-, hydroxy- and fluoro-pyromorphites is 10$^{-84.4}$, 10$^{-78.1}$, 10$^{-76.8}$, and 10$^{-71.6}$, respectively (Ruby et al., 1994). In the absence of halogen or sufficient hydroxyl ions, it is possible that Pb$_3$(PO$_4$)$_2$ (K$_{sp}$=8.0×10$^{-43}$) will be formed. Although Pb$_3$(PO$_4$)$_2$ is also a fairly stable compound, the presence of halogen ions (such as chloride as commonly found in natural waters) can result in the much more stable halo-pyromorphites, thereby greatly enhancing Pb$^{2+}$ immobilization. In addition, Eqns (4-7) also reveal that the treatment pH can also strongly affect the equilibrium and kinetics of pyromorphite formation process, and thus, the Pb immobilization effectiveness.

Effect of chloride ions on immobilization of lead was investigated. Table 3 presents the concentration of TCLP-leachable Pb$^{2+}$ in the three soils amended with the two different doses (Case 1 and Case 2) of nanoparticles for one week and in the presence of 0, 100, and 300 mg/L of Cl$^-$, respectively. For AS, the presence of 100 mg/L Cl$^-$ decreased the TCLP leachability of Pb from 5.07 to 3.55 mg/L in Case 1 and 1.26 to 0.89 mg/L in Case 2, i.e. a reduction of ~30% for both cases. For NS, the presence of 100 mg/L Cl$^-$ reduced the leachability of Pb by 40% in Case 1, but a modest 14% in Case 2. For CS, the presence of 100 mg/L Cl$^-$ reduced the TCLP leachability of Pb by ~23% in both cases. In all cases, the effect of Cl$^-$ appears more profound at the lower nanoparticle dose (Case 1), and it did not enhance the immobilization any further as the concentration of Cl$^-$ was tripled from 100 to 300 mg/L. These observations suggest that promoting the formation of the highly stable chloro-pyromorphite can further enhance immobilization of Pb$^{2+}$; however, this positive effect can be limited by the relative availability of phosphate and Pb$^{2+}$ in soils. Earlier, Stanforth and Qiu (2001) studied effects of various anions including chloride on immobilization of soil-bound lead using sodium phosphate and concluded that the presence of chloride can reduce the TCLP leachability of soil-bound Pb by up to ~60%, whereas the effects of other anions such as F$^-$ and SO$_4^{2-}$ were less profound (37% reduction with F$^-$, and 19% with SO$_4^{2-}$).

The fact that Cl$^-$ addition showed more impact on AS and NS than CS also indicates that HO$^-$ (or pH) also plays an important role as revealed by Eqns (4)-(7). At alkaline pH, OH$^-$ may compete with Cl$^-$ and result in competitive formation of hydroxyl-pyromorphite and chloro-pyromorphite. Stanforth and Qiu (2001) also observed that the effect of chloride on lead leachability was more profound at pH <7.0.

3.5 Effect of Nanoparticle Treatment on $Pb^{2+}$ Speciation in Soils

Sequential extraction procedures have been often applied to identifying the relative availability/leachability of soil-sorbed metals by revealing the operationally defined speciation of a metal in the solid phase (Tessier et al., 1979; Shuman, 1985; Han et al., 2001; Scheckel et al., 2003; Peltier et al., 2005). Earlier, Ryan et al. (2001) employed the procedure to studying effects of phosphate amendments on Pb speciation in soils. They found that phosphate treatments resulted in significant shift in soil-bound Pb species from more easily extractable Pb to the least available form (the residual Pb). They also confirmed the formation of chloro-pyromorphite ($Pb_5(PO_4)_3Cl$) via Extended X-ray Absorption Fine Structure (EXAFS) spectroscopic studies. Similar results were also observed by Cao et al. (2002), who studied the soil Pb speciation in various types of soils treated with phosphate. FIG. 4 shows the changes in fractions of five operationally defined Pb species in the three soils untreated or treated with two different doses of the vivianite nanoparticles. The five Pb species are defined as Exchangeable (EX), Carbonate-Bound (CB), Fe/Mn Oxides-Bound (OX), Organic Matter-Bound (OM), and Residual (RS) Pb. The relative availability follows the sequence of:

$$EX > CB > OX > OM > RS \qquad (8)$$

Figure 4A:
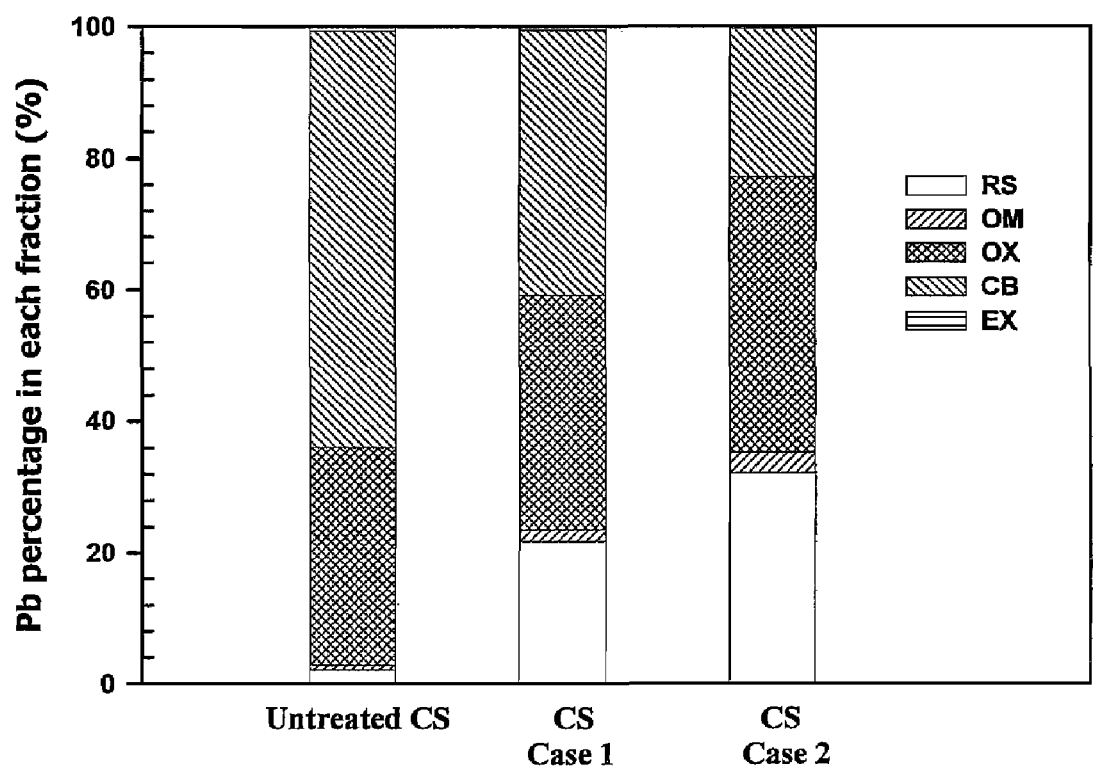
FIG. 4(a) is a graph illustrating changes in Pb speciation in soils before and after soils were amended with 1.56 mM vivianite nanoparticles for 56 days in calcareous soil (CS) at the two doses of nanoparticles (Case 1 and Case 2); Notation EX: exchangeable Pb; CB: carbonate-bound Pb; OX: Fe/Mn oxides-bound Pb; OM-organic matter-bound Pb; RS: residential Pb)

FIG. 4a shows that Pb in the untreated calcareous soil was bound to the soil predominantly in the forms of CB (63%) and OX (33%). The least available RS form accounted for only 2.1%, whereas the EX and OM fractions were negligible in this untreated soil. The observation is expected given the known high carbonate and Fe/Mn, but low organic contents of the soil (Table 1). It also agrees with the observed low TCLP leachability but high PBET bioaccessibility of Pb in this soil. When the soil was mixed with the nanoparticles in Case 1 and Case 2, Pb leached into the aqueous phase was less than 1% Pb initially in the soil. However, the treatments resulted in a substantial shift in Pb speciation from the more easily available CB species to much less available RS and OM species. After the soils were treated in Case 1 and 2, the CB fraction was reduced from 63% to 40% (a 36% reduction) and to 22% (a 65% reduction), respectively. Accordingly, the RS fraction was increased from 2.1% to 22% (>10 times) and 32% (>15 times), respectively. Meanwhile, the OX fraction was also increased from 33% to 36% (Case 1) and 42% (Case 2), and OM fraction from 0.7% to 1.9% (Case 1) and 3.1% (Case 2). The distinctive alteration in Pb speciation, especially the substantial increase in the RS fraction, accounts for the reduced leachability and bioaccessibility of Pb by the vivianite nanoparticles. Based on eqns (4)-(5) and work by others (Cao et al., 2002; Chen et al., 2003; Melamed et al., 2003; Chen et al., 2005), the elevated RS Pb fraction is largely attributed to the formation of the highly stable pyromorphite.

Figure 4B:
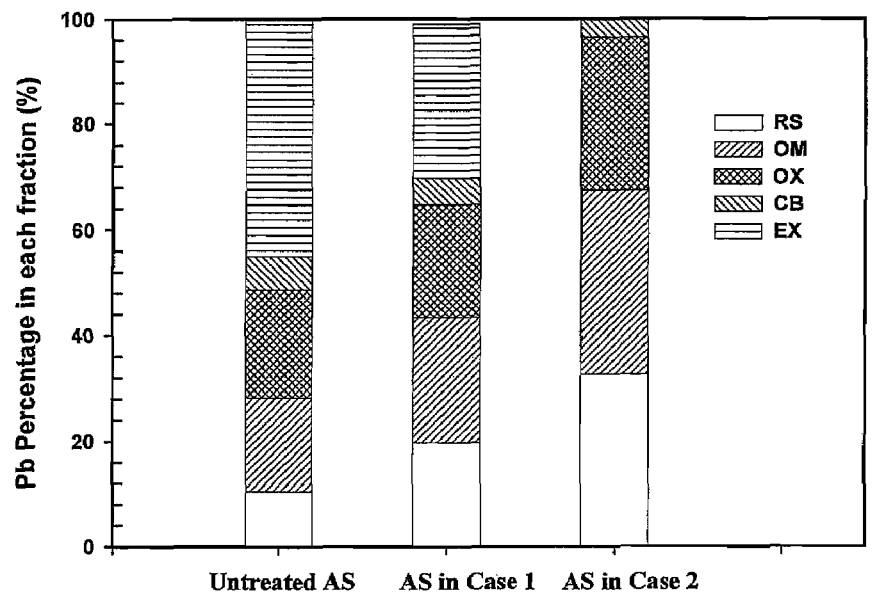
FIG. 4(b) is a graph similar to FIG. 4(a) except in acidic soil (AS); Notation: EX: exchangeable Pb; CB: carbonate-bound Pb; OX: Fe/Mn oxides-bound Pb; OM-organic matter-bound Pb; RS: residual Pb.
Figure 4C:
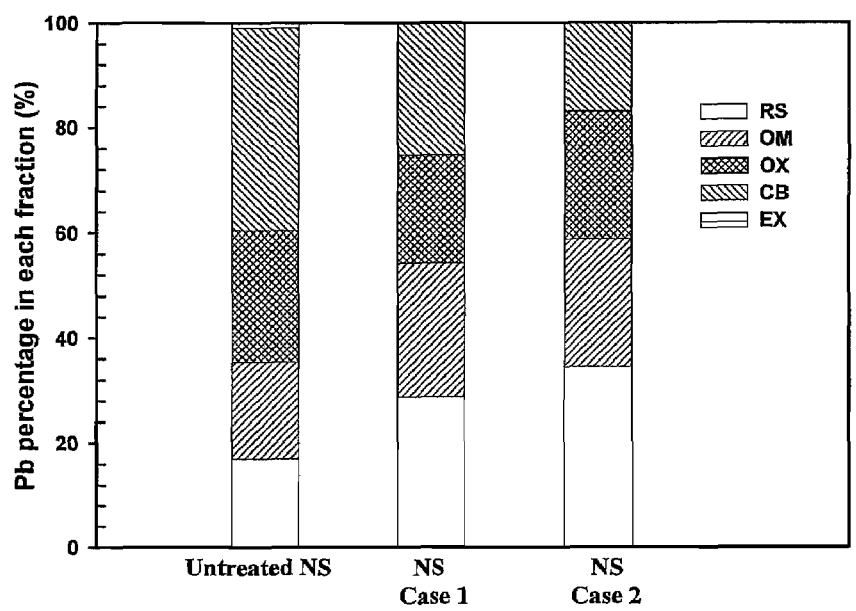
FIG. 4(c) is a graph similar to FIGS. 4(a) and 4(b) except in neutral soil (NS); Notation: EX: exchangeable Pb; CB: carbonate-bound Pb; OX: Fe/Mn oxides-bound Pb; OM-organic matter-bound Pb; RS: residual Pb.

The transformation of more easily available Pb species to the less available pyromorphite was also revealed when the AS and NS soils were treated. FIG. 4b shows that unlike the calcareous soil, the primary Pb species for the untreated acidic soil were split among EX (45%), OX (21%), OM (18%), and RS (10%). Because of the rather great EX fraction, ~3.5% and 5.2% of Pb initially in the soil were released into the aqueous phase when the soil was treated in Case 1 and Case 2, respectively. However, the EX Pb fraction was reduced by 35% in Case 1 and nearly 100% when the dose was pentupled (Case 2). It is evident from FIG. 4b that the EX fraction was primarily converted to RS (increased by 90%, 210% in Case 1 and Case 2, respectively), OM (33% and 96%, respectively), and OX (4.2% and 42.2%, respectively). FIG. 4c shows that the distribution of various Pb species for the neutral soil lies between that for the calcareous and acidic soils. The nanoparticle treatments leached <1% Pb initially in the neutral soil. The conversion of the more easily available Pb (EX or CB) to the less available RS and OM species was consistently evident, and thus, is held responsible for the enhanced stability of Pb upon the nanoparticle treatment for all the soils.

3.6 Potential Environmental Impacts

Iron phosphate exists in natural soils, peat deposits and lake sediments often in the form of $Fe_3(PO_4)_2 \cdot 8H_2O$ (vivianite) (Harris, 2002). There have been no data available on any toxic impacts on the environmental and human health for this mineral (Ralph and Chau, 2006). However, our knowledge on the environmental consequences of synthetic nanoparticles is rather rudimentary, and thus, the long-term environmental fate of the vivianite nanoparticles is yet to be explored. It is also well known that phosphate is a nutrient that often causes eutrophication problem in surface waters; and soluble phosphate is known to be more bioavailable than in its solid forms (Reynolds and Davies, 2001). To address the phosphate leachability, parallel experiments were conducted when the equivalent amount (based on $PO_4^{3-}$ concentration) of the CMC-stabilized nanoparticles or a soluble phosphate ($NaH_2PO_4$) was applied to the treat the three soils in the batch reactors. Table 4 gives the amount of phosphate leached in the supernatant solution after the soils were treated with the two different forms of phosphate for 7 days. Evidently, when the phosphate dosage was low (Case 1), the aqueous phosphate concentration was low and accounted for less than 5% of total phosphate applied for both forms of phosphate and for all the three soils. However, when the phosphate dosage was pentupled (Case 2), nearly 50% of the soluble phosphate applied remained in the aqueous phase compared to less than 1% for CS and NS and about 7% for AS when the vivianite nanoparticles were applied. This observation indicates that the stabilized nanoparticles not only offer great Pb immobilization, but may potentially produce much less leachable phosphate than soluble forms of phosphate. Earlier, Yang et al (2001) also studied Pb immobilization in a smelter-contained urban soil using phosphoric acid, and observed that about 150 mg/L $PO_4$ (or 38% of phosphate added) remained in the solution after the soil samples were treated with 4 mg/g-soil phosphoric acid for 16 days, and the aqueous phosphate was increased to 460 mg/L $PO_4$ (i.e. 58% of phosphate added) when the amendment dosage was increased to 8 mg/g-soil.

4. Conclusions

Major conclusions from this work are summarized as follows:

1). This study developed a new class of iron phosphate nanoparticles prepared using low concentrations of a modified food-grade cellulose (CMC) as a stabilizer. Compared to soluble phosphate or granular solid phosphate sources, the stabilized nanoparticles displayed some unique properties such as improved control of soil mobility, deliverability and reactivity. When used for in situ immobilization of Pb in soils, the nanoparticles offered both fast reaction kinetics and minimal phosphate leachability.

2). Batch experimental data showed that low dosages (P:Pb molar ratio=1.8-1 1) of the stabilized vivianite nanoparticles can effectively decrease the TCLP leachability and PBET bioaccessibility of Pb in three representative soils (calcareous, neutral and acidic). The significant decrease of Pb availability in the soils is attributed to the formation of pyromorphite minerals through the iron phosphate nanoparticle amendment. Lead leachability in an acidic soil was reduced by 56% after the soil was treated with the nanoparticles at a P:Pb molar ratio of 1.8-2.2 for 1 day compared to a 30% and 26% reduction for a neutral soil and a calcareous soil, respectively. At a higher P:Pb molar ratio of 9.0-1 1, the 1-day treatment reduced Pb leachability by 61% for the acidic soil, 55% for the neutral soil and 19% for the calcareous soil.

Faster kinetics of Pb immobilization was observed in the acidic soil samples, confirming that the lead immobilization is facilitated by the formation of pyromorphites and is affected by the availability of both Pb and $PO_4^{3-}$ in soils.

3). Addition of chloride ($Cl^-$) further decreased the TCLP leachability of $Pb^{2+}$ in the soils, which supports the assertion that formation of the least soluble chloro-pyromorphite is responsible for enhanced immobilization of soil-bound Pb. The presence of 100 mg/L of chloride was able to reduce the TCLP leachability of Pb by 30% for the acidic soils, 40% for the neutral soil, and 23% for the calcareous soil.

4). Results from a sequential extraction procedure showed that the nanoparticle treatment of the soils converted large fractions of water soluble/exchangeable and carbonate-bound $Pb^{2+}$ to the most stable form of the residual $Pb^{2+}$, i.e. the highly stable pyromorphite minerals, resulting in the enhanced $Pb^{2+}$ immobilization. The stabilized iron phosphate nanoparticles produce much less phosphate leachate compared to soluble phosphate salts, especially when greater dosage of phosphate is needed, which substantially reduces the risk of secondary contamination (i.e. eutrophication).

5). The newly prepared nanoparticles and the present technology may offer a useful alternative for in situ remediation of Pb-contaminated soils or solid wastes.

TABLE 1

Salient physical and chemical properties of soils used in the study.

| Items | Acidic soil (AS) | Neutral soil (NS) | Calcareous soil (CS) |
|---|---|---|---|
| pH | 4.36 | 6.93 | 7.85 |
| [a]CEC7 (meq/100 g soil) | 10.77 | 18.17 | 34.85 |
| Pb (g/kg) | 0.024 | 0.139 | 0.062 |
| Organic C (%) | 0.60 | 0.90 | 1.2 |
| $CaCO_3$ equiv. (%) | 0.15 | 1.15 | 48.5 |
| Sand (%) | 69 | 18 | 15 |
| Silt (%) | 4.0 | 28 | 29 |
| Clay (%) | 27 | 54 | 56 |
| [b]Clay minerals (%) | K(2.8) | K(33.9) | K(22.4) |
|  | M(39.0) | M(19.1) | M(38.8) |
|  | Q(39.5) | Q(18.8) | Q(21.7) |
|  | S(18.7) | S(28.2) | S(17.1) |

[a]Cation exchange capacity at pH 7.0.
[b]K = kaolinite; M = micas; Q = quartz; S = smectite.

TABLE 2

Experimental conditions for sequential extraction of Pb from soils.

| Step | Extractant | Designated Pb Species |
|---|---|---|
| 1 | 12.5 mL, 1 M $NH_4NO_3$, pH 7.0, 0.5 h shaking | Exchangeable (EX) |
| 2 | 12.5 mL, 1 M Na-acetate, pH 5.0, 6 h shaking | Carbonate-Bound (CB) |
| 3 | 12.5 mL, 0.04 M hydroxylamine hydrochloride in 25% acetic acid, 6 h at 95° C. in water bath | Fe/Mn Oxides-Bound (OX) |
| 4 | 1.5 mL of 0.01 M $HNO_3$ and 2.5 mL of 30% $H_2O_2$, 5 h at 85° C. in water bath, followed by an additional 1 mL of $H_2O_2$, 1 h at 85° C. in water bath, then 7.5 mL of 1 M $NH_4NO_3$, 10 min shaking at room temperature | Organic Matter-Bound (OM) |
| 5 | 12.5 mL, 4 M $HNO_3$, 16 h at 80° C. in water bath | Residual (RS) |

TABLE 3

Effects of chloride on TCLP leachable Pb in soils amended with stabilized vivianite nanoparticles (data given as mean ± standard deviation).

| Chloride in Nanoparticle Suspension (mg/L) | Acidic soil | | Neutral Soil | | Calcareous Soil | |
|---|---|---|---|---|---|---|
| | 2:1 | 10:1 | 2:1 | 10:1 | 2:1 | 10:1 |
| | \multicolumn{6}{c}{Pb concentration in TCLP extracts (mg/L)} | | | | | |
| 0 | 5.07 ± 0.34 | 1.26 ± 0.15 | 1.24 ± 0.09 | 0.22 ± 0.02 | 0.31 ± 0.03 | 0.19 ± 0.01 |
| 100 | 3.55 ± 0.20 | 2.39 ± 0.15 | 0.75 ± 0.02 | 0.34 ± 0.01 | 0.24 ± 0.01 | 0.22 ± 0.01 |
| 300 | 4.46 ± 0.32 | 2.27 ± 0.10 | 0.77 ± 0.02 | 0.32 ± 0.01 | 0.23 ± 0.02 | 0.19 ± 0.01 |

TABLE 4

Phosphate leached from soils after being amended with vivianite nanoparticle suspension or sodium phosphate ($NaH_2PO_4$) solution for 7 days (data given as mean ± standard deviation)

Phosphate ($PO_4^{3-}$) concentration (C) in solution or mass % leached

| | Vivianite nanoparticle suspension (300 mg/L as $PO_4^{3-}$) | | | | Sodium phosphate solution (300 mg/L as $PO_4^{3-}$) | | | |
|---|---|---|---|---|---|---|---|---|
| | Suspension-to-soil ratio = 2:1 (mL/g) | | Suspension-to-soil ratio = 10:1 (mL/g) | | Solution-to-soil ratio = 2:1 (mL/g) | | Solution-to-soil ratio = 10:1 (mL/g) | |
| Soil type | C (mg/L) | % | C (mg/L) | % | C (mg/L) | % | C (mg/L) | % |
| Calcareous soil (CS) | 6.19 ± 0.65 | 2.08 ± 0.22 | 1.01 ± 0.24 | 0.34 ± 0.08 | 14.64 ± 1.68 | 4.88 ± 2.56 | 193.23 ± 12.62 | 64.41 ± 5.54 |

TABLE 4-continued

Phosphate leached from soils after being amended with vivianite
nanoparticle suspension or sodium phosphate (NaH$_2$PO$_4$) solution for 7 days (data
given as mean ± standard deviation)

Phosphate (PO$_4^{3-}$) concentration (C) in solution or mass % leached

| | Vivianite nanoparticle suspension (300 mg/L as PO$_4^{3-}$) | | | | Sodium phosphate solution (300 mg/L as PO$_4^{3-}$) | | | |
|---|---|---|---|---|---|---|---|---|
| | Suspension-to-soil ratio = 2:1 (mL/g) | | Suspension-to-soil ratio = 10:1 (mL/g) | | Solution-to-soil ratio = 2:1 (mL/g) | | Solution-to-soil ratio = 10:1 (mL/g) | |
| Soil type | C (mg/L) | % | C (mg/L) | % | C (mg/L) | % | C (mg/L) | % |
| Neutral soil (NS) | 9.08 ± 1.22 | 3.05 ± 0.23 | 1.55 ± 0.30 | 0.52 ± 0.10 | 1.98 ± 0.24 | 0.66 ± 0.08 | 149.01 ± 10.62 | 49.67 ± 3.45 |
| Acidic soil (AS) | 8.42 ± 0.98 | 2.83 ± 0.33 | 21.02 ± 3.63 | 7.06 ± 0.58 | 4.68 ± 0.33 | 1.56 ± 0.11 | 146.01 ± 15.63 | 48.67 ± 5.21 |

EXAMPLE 2

I. Introduction

The objectives of this experiment are to synthesis a stable and dispersive iron sulfide nanoparticles using a low-cost, food-grade polysaccharides (e.g. cellulose) as effective and "green" stabilizers to yield FeS nanoparticles suitable for the in-situ injection uses and to use them as an in-situ remediation technology for mercury immobilization in soil or sediment. The specific goals include 1) to synthesize a new class of FeS nanoparticles using carboxylmethyl cellulose as a stabilizer; 2) to characterize FeS nanoparticles; 3) to study the mobility of FeS nanoparticles in sediment; 4) to investigate the efficiency of mercury immobilization by using FeS nanoparticles in sediment.

II. Materials and Methods

Chemicals used. The following chemicals were used as received: iron(II) sulfate heptahydrate (FeSO$_4$.7H$_2$O, Acros Organics, Morris Plains, N.J.); mercury nitrate (Hg(NO3) 2.7H$_2$O); sodium carboxymethyl cellulose salt (NaCMC, Average MW 90,000, DS=0.7, Acros Organics, Morris Plains, N.J.); sodium nitrate (NaNO$_3$, Fisher, Fair lawn, N.J.) sodium sulfide (Na$_2$S.9H$_2$O, Fisher, Fair lawn, N.J.); patassium bromide (KBr, Fisher, Fair lawn, N.J.), patassium bromate (KBrO$_3$, Fisher, Fair lawn, N.J.).

Sediment. A clay-loam sediment was obtained from a fishing pond in Auburn AL and was used in this study. The sediment was air-dried and sieved through a 2-mm screen, Soil aggregates were broken by hand and a mortar with pestle before sieving. All experiments were conducted using the soil fraction of less than 2 mm, which was thoroughly mixed before used. Table 5 lists the properties of this sediment. Hg was loaded to this sediment by following the procedure described by Piao (2002). Briefly, weigh 100 to 200 g air-dried sediment and add half of them to a 1 L Teflon vessel. Add 0.1-2 g Hg(NO$_3$)$_2$.H$_2$O (g) to the vessel and then add the other half of weighted sediment on the top. At last add 5% deionized water and age it for one month. During the aging period, mix the sample manually on a daily basis. 2 Hg-loaded sediments were prepared in this study, i.e. high-content and low-content. The aged-sediments were digested by following Appendix to Method 1631 (Total Mercury in Tissue, Sludge, sediment, and Soil by Acid Digestion and BrCl Oxidation) and mercury in the digestates were analyzed to calculate mercury contents.

TABLE 5

The salient properties of the clay loam sediment

| pH | CEC cmol kg$^{-1}$ | Organic carbon (%) | Sand (%) | Silt (%) | Clay (%) | Clay* minerals |
|---|---|---|---|---|---|---|
| 6.6 | 14.5 | 2.5 | 30 | 33 | 37 | (K)(M) (S) |

*K = Kaolinite, M = Maca, Q = Quartz, S = Smectite

TABLE 6

Composition of the Mercury-loaded sediment

| Sediment Type | Desired Mercury Content (mg/kg) | Hg(NO$_3$)$_2$•H$_2$O (g) | Clay Loam Sediment (g) | Water (mL) | Measured Mercury Content (mg/kg) |
|---|---|---|---|---|---|
| High-Hg | 5,000 | 0.795 | 92.86 | 4.6 | 3119.92 |
| Low-Hg | 350 | 0.118 | 196.70 | 10 | 177.18 |
| Original Sediment | | | | | 0.88 |

Preparation of FeS nanoparticles. FeS nanoparticles were prepared by in three steps. Step 1. Prepare a dilute cellulose solution containing 1% (w/w) of a NaCMC and a Fe$^{2+}$ solution containing 0.1-1 M Fe$^{2+}$ and adjust pH to 8-9. Step 2. Prepare Fe$^{2+}$-CMC complex by mixing Fe$^{2+}$ and NaCMC solutions and vary the stabilizer-to-Fe molar ratio and/or types of the stabilizer for preparing particles of desired size and dispersibility. Step 3. Add stoichiometric amounts of Na$_2$S solution into the above solution and allow for reaction for 20 minutes under vacuum and at room temperature.

Characterization of FeS nanoparticles by TEM, DLS (dynamic light scanning), XRD. Transmission electron micrograph images were obtained using a Zeiss EM10 transmission electron microscope (TEM) (Zeiss, Thornwood, NJ) operated at 25 and 40 kV. The TEM image was analyzed using a specialty image processing software named ImageJ to analyze the particle size. The details of sample preparation and software operation have been reported (He and Zhao, 2005). Dynamic light scattering (DLS) tests were performed with a Nicomp 380 Submicron Particle Sizer (PSS, Santa Barbara, Calif.) at a measurement angle of 90° (Internal He—Ne laser, wavelength 633 nm). The freshly prepared FeS was diluted to 0.05 g/L with nitrogen-purged deionized water before DLS measurement. Solution viscosity (1.0) was measured by a Gilmont falling ball viscometer, then used to correct for the influence of viscosity on particle mobility. The DLS data were processed and analyzed with a software package CW380 to yield the number-weighted size distributions.

Preparation of mercury contaminated sediment and soil. Take about 2.5 g washed and dried soil to Teflon vials, 0.1 ml, 2 ml and 10 ml FeS solutions and 9.9 ml, 8 ml and 0 ml DI water were added to amend the soils respectively. For comparison, parallel samples were prepared by adding 10 ml DI water. The components of each Teflon vial are listed in Table 6. Fill the tubes with mercury stock solution (concentration was 35 ppm). Put the tubes on a rotator (30 rpm) and run for 48 hours. Samples were centriguged with accuspin 400 at 6000 g for 10 minutes and filtered with 0.22 μm membrane filter. Dried the filtered mercury-loaded soil samples in oven at 40 C. Filtrates were preserved with BrCl overnight and analysized for Hg. Table 6 shows the soil loading results.

Batch tests of mercury immobilization by FeS nanoparticles. 3 g of sediment was added to 30 mL Teflon vials and the Teflon vials were filled with FeS nanoparticle solution without headspace. The solution pH was adjusted with $HNO_3$/NaOH to a range from 4 to 10 and the solution pH was kept to its original value through intermittent adjustment using $HNO_3$/NaOH. In about one week, the pH of the solutions stop changing, suggesting that equilibrium was arrived. Samples were centrifuged with accuspin 400 at 6000 g for 20 minutes and filtered with Acrodisc syringe filter with 0.2 μm Tuffryn membrane. The filtrates were preserved with BCl and mercury was analyzed.

Column tests of the mobility of FeS nanoparticles. Column tests were carried out with an experiment set-up including a Plexiglass column (diameter=10 mm, length=100 mm, Omnifit, Cambridge, England), a HPLC pump and a fraction collector (Eldex Laboraries, Napa, Calif.). Typically, about 5 g of Hg-loaded sediment was packed in the column. An influent solution was passed upwardly through the sediment bed at an EBCT (Empty Bed Contact Time) of about 50 minutes and an SLV (Superficial Liquid Velocity) of 0.05 to 0.10 ml/min. The effluent was collected in the fraction collector. Since the mercury in the effluent is easily lost to air, about 4 drops of BrCl was added to each collection tube to oxidize mercury and samples were sealed with parafilm immediately. Samples in collection tubes were taken to analyze total mercury.

TCLP test. 2.25 g of dried FeS amended soil or unamended soil from the Teflon vials and 45 ml TCLP fluid #1 was added to the tubes without headspace. The samples were mixed in a rotator (30 rpm) for 18 hours and centrifuged with accuspin 400 at 6000 g for 20 minutes and filtered with Acrodisc syringe filter with 0.2 μm Tuffryn membrane. The filtrates were preserved with BCl and mercury was analyzed.

Analytical methods. Total mercury was determined after treating about 25 ml of the aqueous sample with 5 drops of bromine monochloride (BrCl) oxidizing solution, destroying the excess BrCl with a hydroxylamine hydrochloride ($NH_2OH.HCl$) solution until yellow color disappears. Mercury was then analysed after reduction with stannous chloride using cold vapour atomic absorption spectrometry (CVAAS) (Viva). The reagents were prepared by following Method 1631C and all determinations were performed in duplicate. The determination limit of total mercury was 0.5 μg/L.

Sulfate was analyzed using a Dionex Ion Chromatography (DX-120) equipped with an AS14 column, an AG14 guard column, and a 100 μL sample loop. A solution containing 3.5 mM sodium carbonate and 1.0 mM sodium bicarbonate was used as the eluent. Sulfide was analyzed using Method 376.1. The detection limit was 0.1 mg/L.

III. Results and Discussion

Figure 5A:
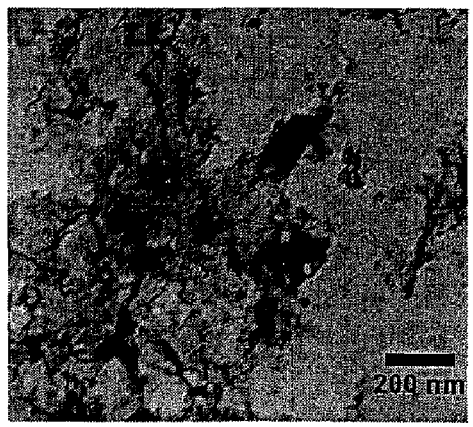
FIG. 5(a) is a TEM image of 0.5 g/L iron sulfide nanoparticles prepared in water without a stabilizer.
Figure 5B:
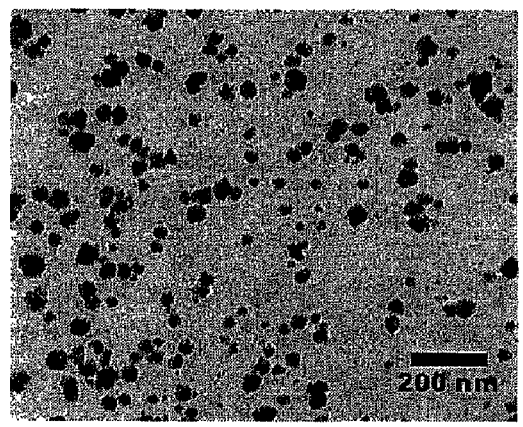
FIG. 5(b) is a TEM image of 0.5 g/L iron sulfide nanoparticles prepared in water with 0.2% (w/w) NaCMC stabilizer.

Characterization of Stabilized FeS Nanoparticles and role of CMC i. TEM images of FeS particles with or without the presence of a stabilizer ii. Particle size distribution based on TEM images and DSL results iii. Surface area calculation based on particle size distribution iv. Chemical composition of FeS nanoparticles and FeS—Hg product based on XRD analysis v. Role of Stabilizer FIGS. 5($a$) and 5($b$) compare the transmission electron micrographs of the 0.5 g/L FeS particles prepared without a stabilizer (FIG. 5($a$)), and with 0.2% (w/w) NaCMC (FIG. 5($b$)). Both particles were prepared under otherwise identical conditions. FIG. 5($a$) shows the FeS particles prepared without a stabilizer, which appears to be aggregates. The size of these flocs can be larger than 1 μm. This type of aggregation of FeS particles can be attributed to the magnetic forces and Van der Waals forces among the individual FeS particles. FIG. 5($b$) shows FeS nanoparticles stabilized by 0.2% (w/w) NaCMC, which appear to be clearly discrete and well-dispersed. The presence of NaCMC as a stabilizer prevented aggregation of FeS particles and thus maintained the high surface area and reactivity of the particles.

Figure 6:
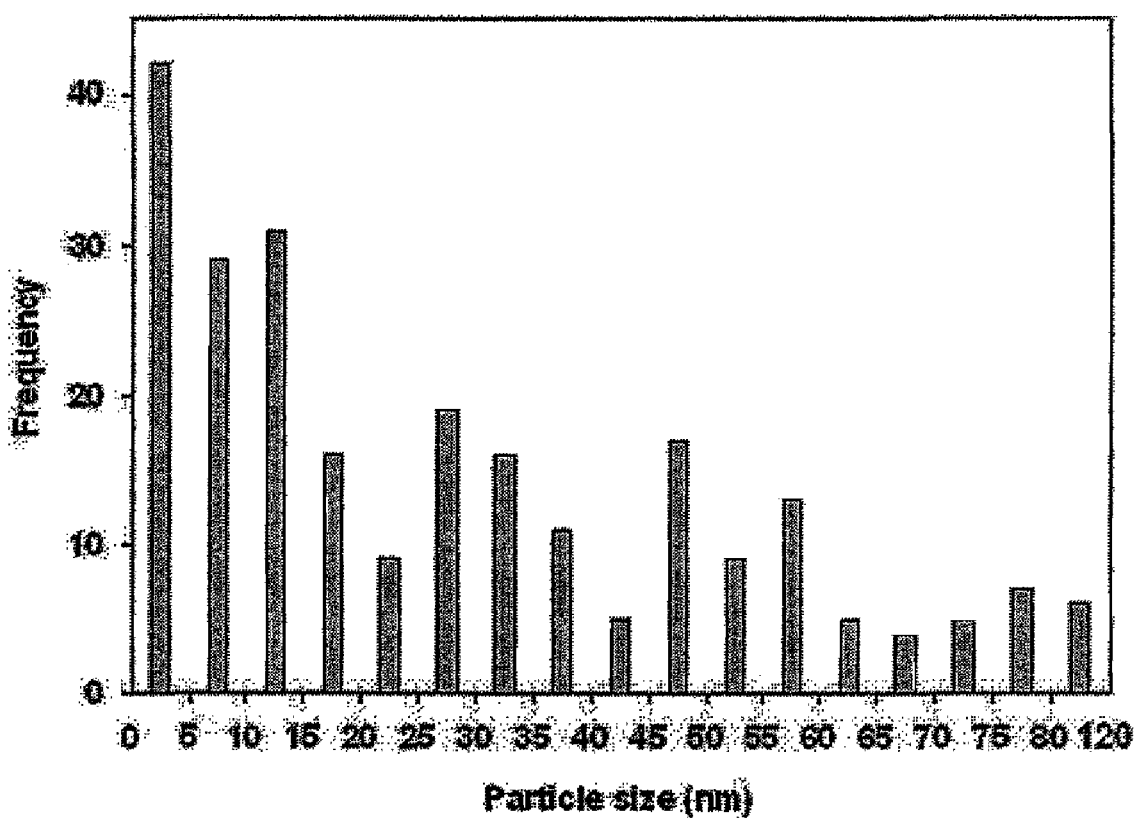
FIG. 6 is a histogram showing the size distribution of NaCMC stabilized iron sulfide nanoparticles for a random sample of the composition of FIG. 5(b)

FIG. 6 shows the particle size distribution of NaCMC-stabilized FeS nanoparticles for a random sample of 247 particles from TEM images. The particle size was in the range of 3 to 120 nm and the mean particle size was calculated to be 29.44 nm with a standard deviation of 24.94 nm. This calculation was consistent with the measurement from DSL analysis, which measured the particle size to be 38.50 nm with a standard deviation of 5.4 nm.

After 3 months of storage, the stabilized particles remained suspended in water. And the particle size from the DSL measurement was found to be 31.40 nm with a standard deviation of 4.00 nm. This decrease can be attributed to FeS dissolution in the solution or oxidation by the dissolved oxygen. In contrast, the nonstabilized FeS particles agglomerated and precipitated nearly completely in a few minutes after preparation.

The results above proved that CMC played an important role in stabilizing the iron sulfide nanoparticles. CMC is a cellulose derivative with carboxymethyl groups (—$CH_2$—COOH) bound to some of the hydroxyl groups of the glucopyranose monomers. The hydroxyl and carboxyl functional groups of CMC can form weak complex with iron, which has been well-studied by He and Zhao (2006). This complexation can stabilize iron sulfide nanoparticles electrostatically and sterically. Shi et al. (2006) utilized dentrimer ligands, such as hydroxyl and carboxyl functional groups, and interior tertiary amines, of ethylenediamine core poly (amidoamine) (PAMAM) to prepare iron sulfide nanoparticles.

Immobilization of Mercury by FeS Nanoparticles in Column Tests

Figure 7:
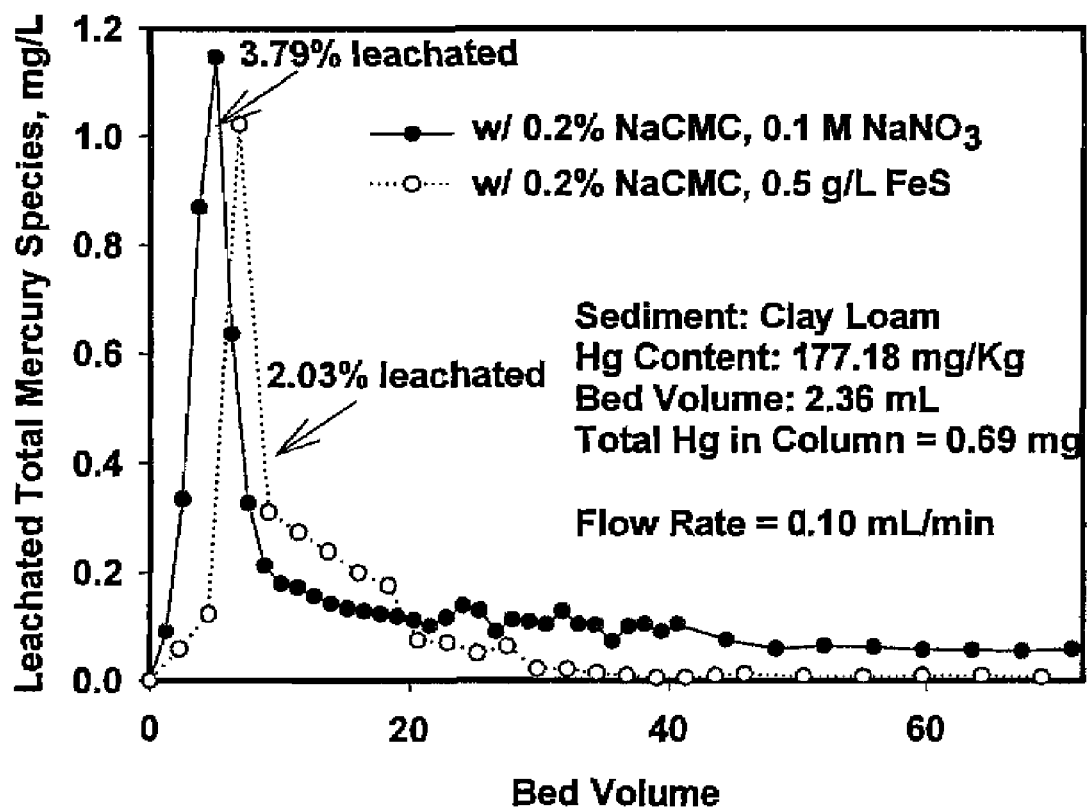
FIG. 7 is a graph illustrating mercury leachated from a low-mercury content clay loam sediment column by an influent with or without the presence of FeS nanoparticles.
Figure 8:
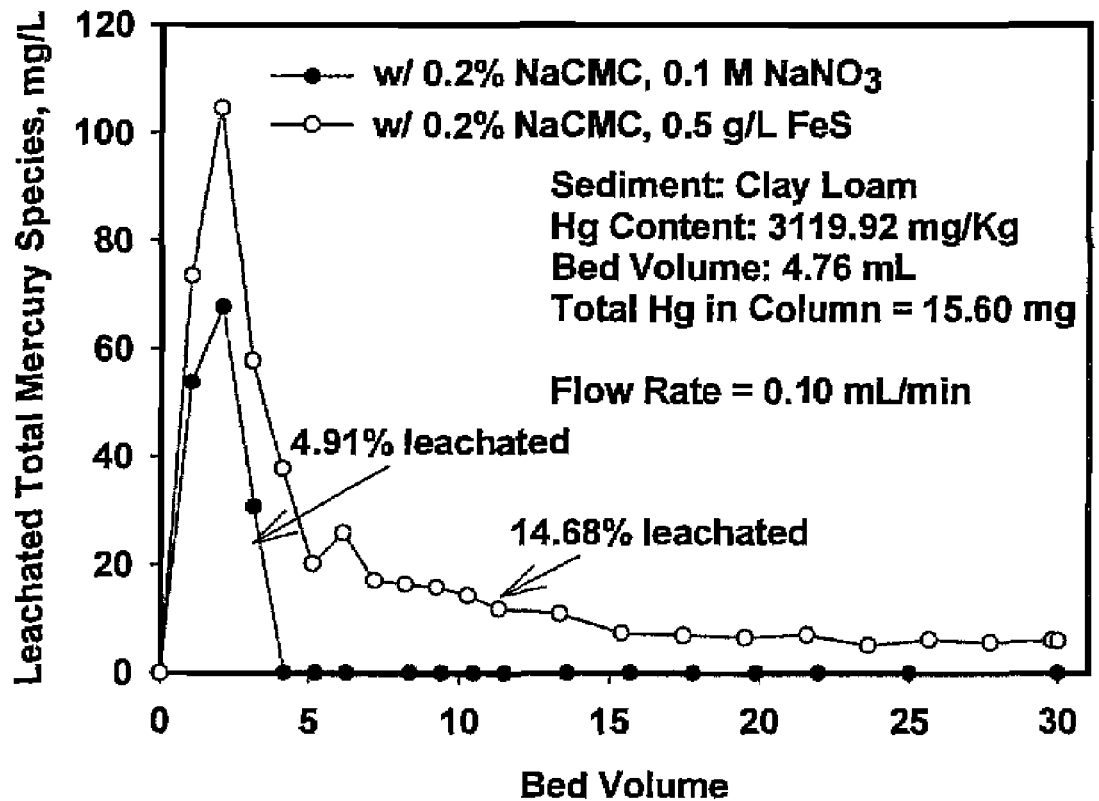
FIG. 8 is a graph illustrating mercury leachated from a high-mercury content clay loam sediment column by an influent with or without the presence of FeS nanoparticles.

FIG. 7 and FIG. 8 show mercury leachated by an influent with or without the presence of FeS nanoparticles from a low-mercury content and a high-mercury content clay loam sediment column, respectively. In each curve of both figures, there is a mercury concentration peak in the effluent during the first 5-10 BV (bed volume) followed by a trail. When no FeS nanoparticles presented in the influent, leachated mercury keeps decreasing until it reach a relative constant concentration.

Mercury concentration remains around 58 ηg/L after 50 BV in FIG. 7 when a low-mercury content sediment was used, and mercury concentration reached constant 6.2 mg/L after 20 BV in FIG. 8 when a high-mercury content sediment was used. By comparing the mercury in the effluent to the total mercury loaded onto the sediment, we can find that a total of 3.79% mercury was washed off by using 0.2% NaCMC and 0.1 M $NaNO_3$ solution from a low-mercury content sediment and 14.68% mercury was washed off by using the same solution from a high-mercury content sediment.

In the sediment, mercury are either attached to the binding sites, such as Fe/Mn oxide, amorphous organosulfur, or mineral lattice (Zhong and Wang, 2006), or dissolved in the pore water in the form of $Hg(OH)_2^0(aq)$, $Hg(OH)_3^-$, $Hg^0$ (aq) (Hamilton et al., 1997). When the sediment was flushed with NaCMC solution or FeS nanoparticles solution, the mercury species in the aqueous phase were firstly pushed out. Then the mercury species that attached to the weak binding sites such as Fe/Mn oxide, carboxyl and phenol functional groups (Drexel et al., 2002) will be washed off. And the mercury species that attached to the strong binding site such as thiol (R—SH), disulfide (R—SS—R), and disulfane (R—SSH) functional groups (Xia et al., 1999; Skyllberg et al., 2006) are the last to leachate out. This explains the mercury concentration peaks in the effluent in the beginning stage.

The reason why it takes longer time to reach leaching equilibrium for a low-mercury content sediment column than for a high-mercury content sediment column could be that mercury has been attached to a low-mercury content sediment more strongly. For the same sediment, a low-mercury content means a higher adsorption site to mercury ratio, which may results in a stronger mercury adsorption bond. As a result mercury is more difficult to be washed off the sediment. This also explains why more than 3 times of mercury was washed off from the high-mercury sediment than from the low-mercury content sediment.

In the presence of FeS nanoparticles, the mercury concentration peak heights were decreased and mercury concentration was reduced significantly. The mercury concentration in the effluent dropped to less than 5 ppb after 50 BV in FIG. 7, and it dropped to less than 3 ppb after 15 BV in FIG. 8. From the concentration data, it was found that 2.03% mercury was washed off from a low-mercury content sediment and 4.91% mercury was washed off from a high-mercury content sediment by using 0.5 g/L FeS nanoparticles solution, which are 46.43% and 66.55% less than those when 0.2% NaCMC solution was used as the influent, respectively. In another words, 46.43% and 66.55% of leachable mercury was immobilized by FeS nanoparticles in the low-mercury content sediment and high-mercury content sediment, respectively. Since mercury concentration reached a constant level in the 0.2% NaCMC solution while it kept decreasing to less than 5 ppb, high percentage of mercury will be immobilized if the sediments are treated with more volume of influents.

Figure 9:
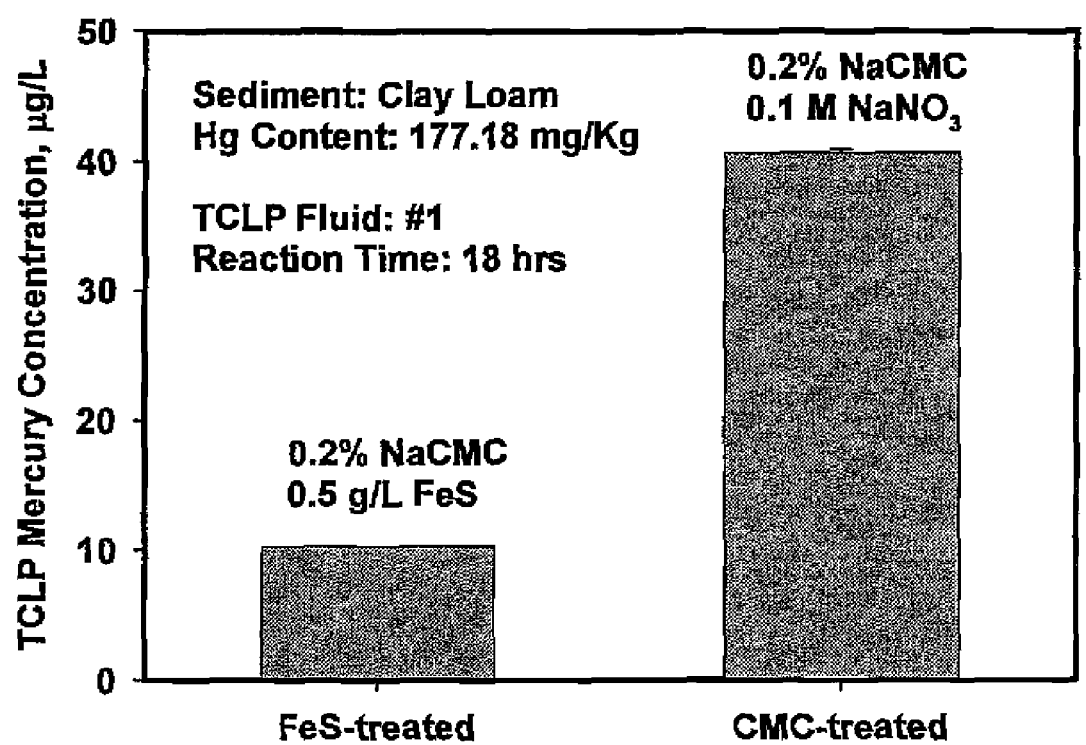
FIG. 9 is a bar graph illustrating TCLP mercury concentration from a low-mercury content clay loam sediment treated with or without the presence of FeS nanoparticles.
Figure 10:
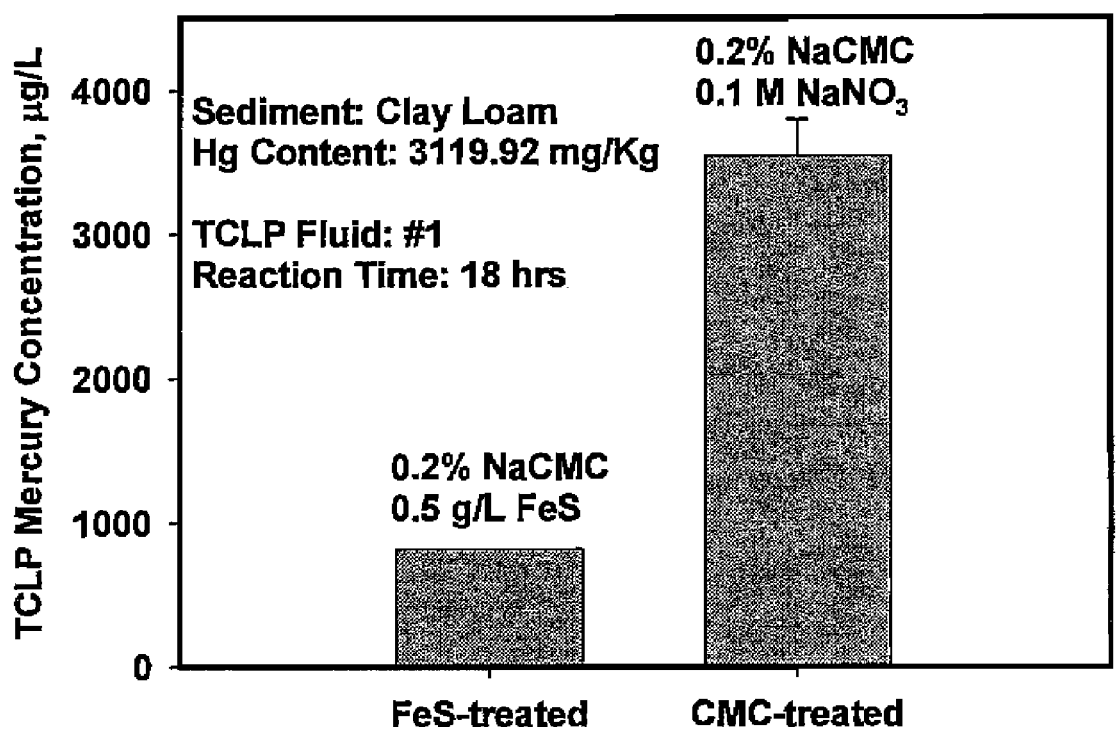
FIG. 10 is a bar graph illustrating TCLP mercury concentration from a high-mercury content clay loam sediment treated with or without the presence of FeS nanoparticles.

The sediments that were treated with NaCMC solution or FeS solution were dried at 50° C. in an oven overnight and were further leached in TCLP solution. As shown in FIG. 9 and FIG. 10, only 25.29% and 23.14% of mercury were leached from the FeS treated sediment compared to the CMC-treated sediment for the low-mercury content sediment and the high-mercury content sediment, respectively. It is noteworthy that, even the high-mercury content sediment was treated with 30 BV of 0.5 g/L FeS nanoparticles solution, the mercury concentration in TCLP solution was still higher than the standard (200 µg/L). This result suggests that the high-mercury content sediments need to be treated with more FeS nanoparticles in order to achieve TCLP standard.

EXAMPLE 3

Figures 11A, 11B:
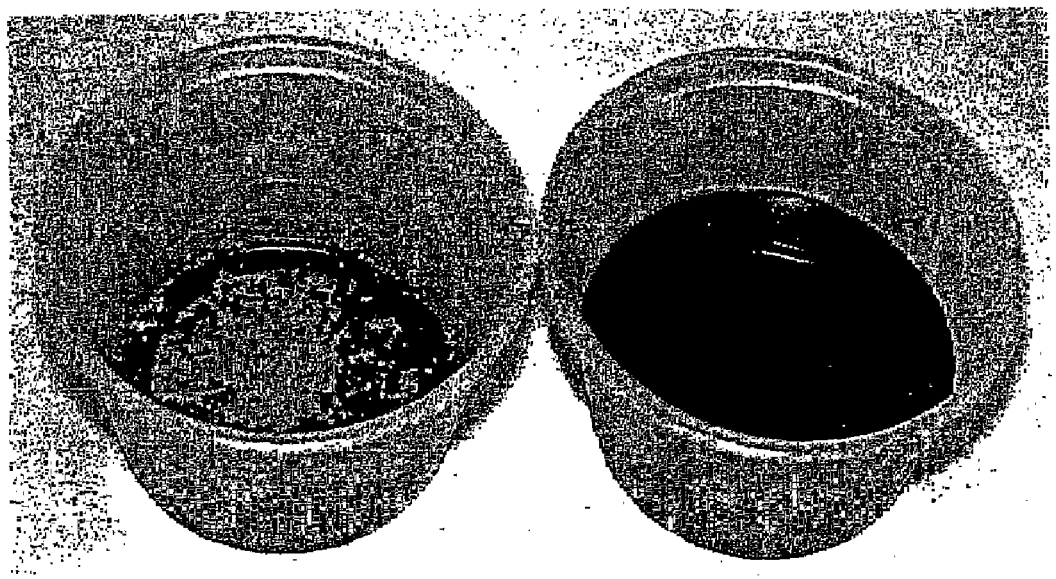
FIG. 11(a) illustrates 0.5 g/L iron sulfide nanoparticles prepared in water in the absence of a stabilizer.
FIG. 11(b) illustrates 0.5 g/L iron sulfide nanoparticles prepared in water in the presence of 0.1% (w/w) of NaCMC.

FeS nanoparticles were prepared following the procedure of Example 2 except at a concentration of 0.5 g/L FeS particles in water, both in the absence of NaCMC stabilizer and the presence of 0.1%(w/w) of NaCMC. FIGS. 11(a) and 11(b) show that the presence of cellulose (NaCMC) can fundamentally alter the dispersibility/stability of the FeS particles. While non-capped FeS precipitate (FIG. 11(a)) in a few minutes (thereby losing mobility), capped FeS particles remain fully dispersed in water for days (FIG. 11(b)). When kept in sealed vials, the stabilized nanoparticles remain fully suspended for weeks.

Figure 12A:
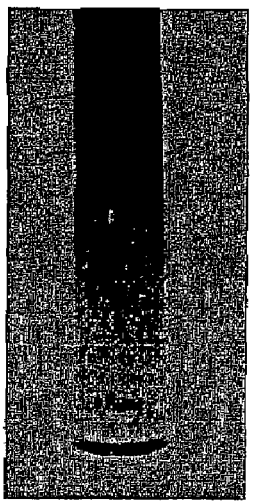
FIG. 12(a) illustrates the progression of a 0.5 g/L dispersion of iron sulfide nanoparticles prepared in water with 0.1% (w/w) starch stabilizer through a loamy-sandy soil by gravity one minute after introduction of the suspension.
Figure 12B:
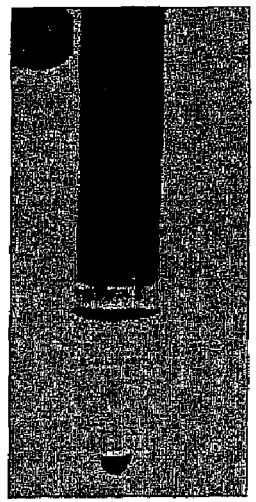
FIG. 12(b) is similar to FIG. 12(a) except it shows the progression of the suspension after 20 minutes.
Figure 12C:
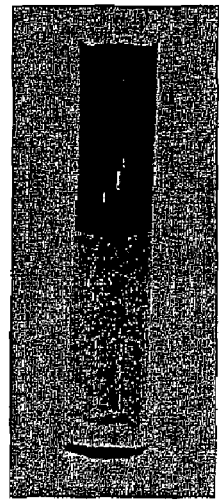
FIG. 12(c) is similar to FIGS. 12(a) and 12(b) except it shows the progression of a 0.5 g/L dispersion of iron sulfide nanoparticles prepared in water in the absence of a stabilizer.

FIGS. 12(a) and 12(b) show that a dispersion of 0.5 g/L FeS nanoparticles stabilized with 0.1% (w/w) of NaCMC can be fully dispersed by gravity in a loomy-sandy soil. FIG. 12(a) shows the mobility of the FeS particles after 1 minute while FIG. 12(b) shows the FeS particles fully dispersed after 20 minutes. In contrast, FIG. 12(c) shows that 0.5 g/L of non-stabilized FeS particles were caught on top of the soil bed even after 30 minutes.

Figure 13A:
FIG. 13(a) is a TEM image of 0.5 g/L iron sulfide nanoparticles prepared in water without a stabilizer.
Figure 13B:
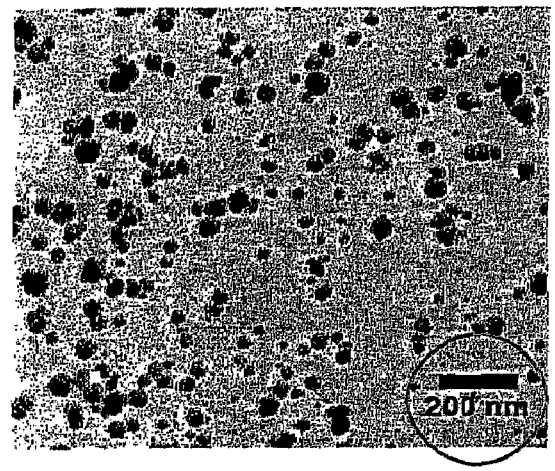
FIG. 13(b) is a TEM image of 0.5 g/L iron sulfide nanoparticles prepared in water with 0.1% (w/w) NaCMC stabilizer.

FIGS. 13(a) and 13(b) compare TEM images of the FeS particles prepared without a stabilizer (FIG. 13(a)) and with 0.2% (w/w) NaCMC (FIG. 13(b)). While the non-stabilized FeS particles appear as bulky dendritic flocs, the cellulose-capped FeS appear as discrete nanoscale particles with a mean diameter of 45±20 nm (standard deviation). Similar results were also observed when a water-soluble starch was used as a capping agent although the mean particle size was increased to about 85 nm. This observation strongly supports the premise that the particle size, morphology and dispersibility of FeS particles can be altered/controlled by use of a capping agent. To our knowledge, this is the first FeS nanoparticles prepared in water using starch or cellulose as a stabilizer.

Figure 14A:
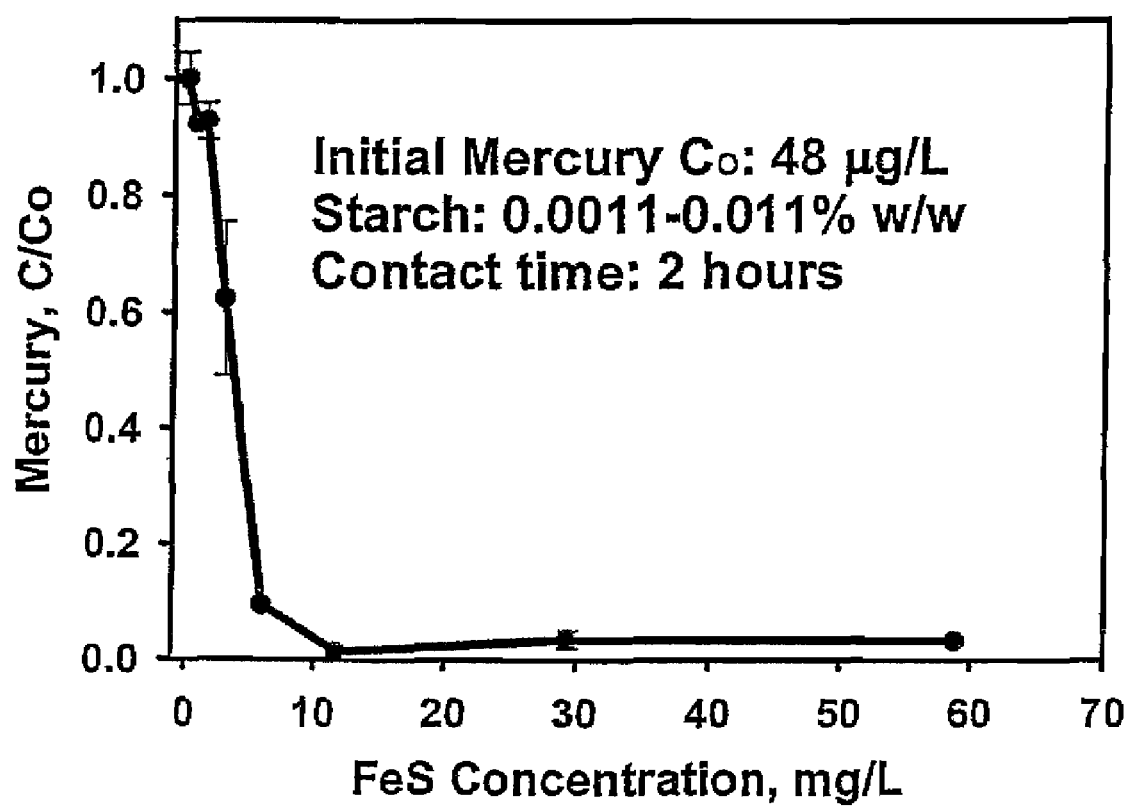
FIG. 14(a) is a graph illustrating the removal of mercury from water as a function of the dosage of iron sulfide nanoparticles stabilized with 0.0011 to 0.011% (w/w) starch, showing that at a dosage of 10 mg/L nearly all mercury is removed.
Figure 14B:
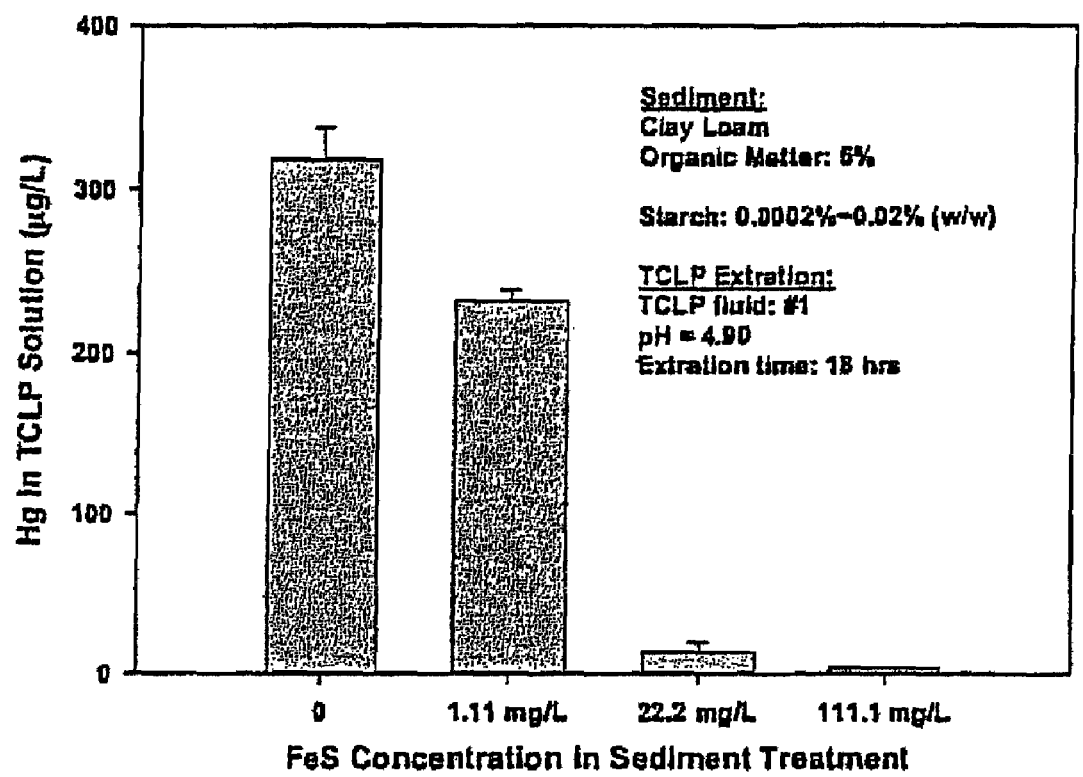
FIG. 14(b) is a bar graph illustrating the decrease in mercury leachability per TCLP method of a 318 mg/kg mercury-loaded clay-loam sediment treated with various concentrations of iron sulfide nanoparticles at pH 4.9, showing that TCLP leachability is reduced by about 95% for a sediment treated at 22.2 mg/L of iron sulfide.
Figure 14C:
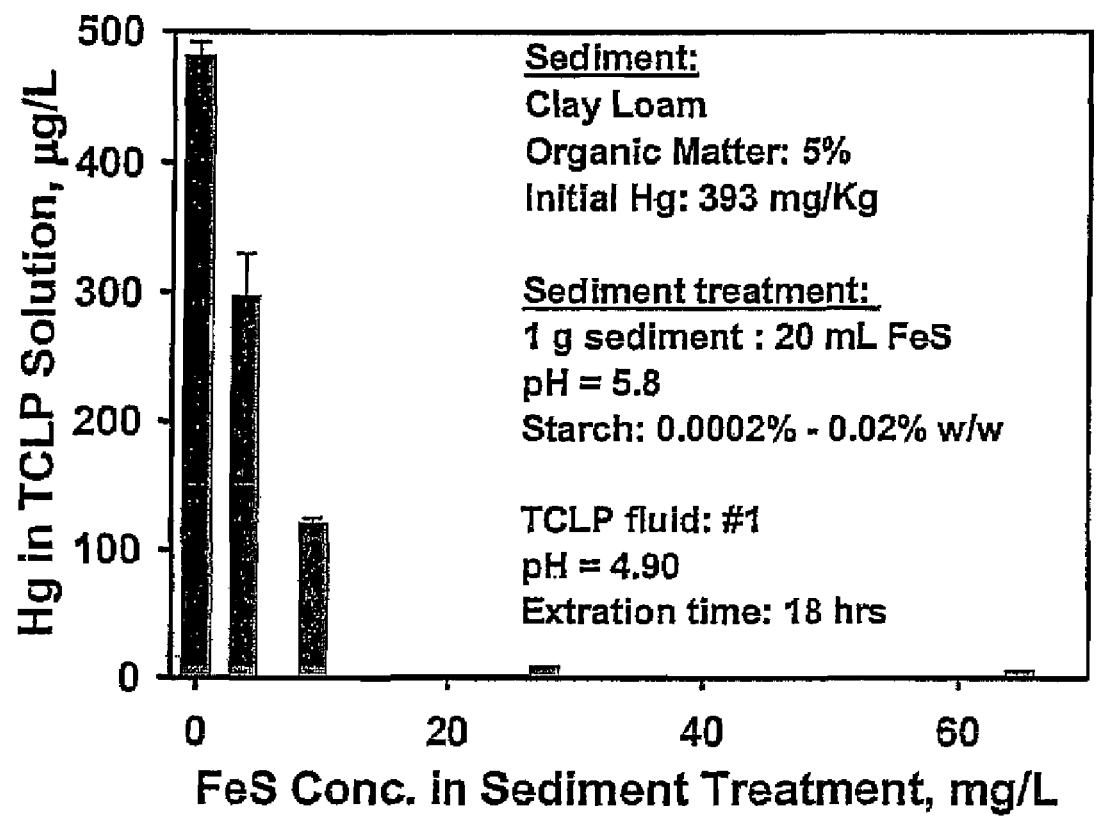
FIG. 14(c) is a bar graph similar to FIG. 14(b) except the initial mercury loading was 393 mg/kg and the pH was 5.8, showing TCLP leachability is reduced by greater than 98% for a sediment treated at 30 mg/L of iron sulfide.

FIG. 14(a) illustrates removal of Hg from water as a function of dosage of starched-FeS nanoparticles (C=Hg concentration remaining). FIG. 14(b) illustrates decrease in Hg leachability per TCLP method of a Hg-preloaded clay-loam sediment treated with various concentrations of FeS at pH 5.8 (solid:suspension =1 g:20 mL). Initial Hg in soil=318 mg/kg. FIG. 14(c) also illustrates results of Hg leachability, except the initial Hg loading in the soil was 393 mg/kg. Note: 1) All experiments were carried out in 45 mL Teflon vials without headspace and under anaerobic condition; 2) FeS nanoparticles were separated from liquid phase by high-speed (about 7000g) centrifuging; 3) Error bars indicate standard deviation from the mean of duplicates; 4) Hg in water or TCLP liquid was analyzed following EPA method 245.1 (Cold Vapor AAS).

FIG. 14(a) shows that addition of about 10 mg/L starched FeS can nearly completely remove/immobilize 48 µg/L Hg from water. FIG. 14(b) indicates that treating a Hg-laden sediment using 22.2 mg/L starch-capped FeS suspension can reduce the TCLP (Toxic Characteristic Leaching Procedure) leachability of Hg by over 95%. FIG. 14(c) indicates that treating Hg-laden sediment using 30 µg/L starch capped FeS suspension can reduce TCLP leachability of Hg by greater than 98%. These observations illustrate that application of the FeS nanoparticles can substantially reduce the biological availability, hence methylation, of Hg in water and soils/sediments.

EXAMPLE 4

I. Introduction

The objectives of this study are to synthesis stable and dispersive iron sulfide nanoparticles using a low-cost, food-grade polysaccharide (e.g. cellulose) as an effective and "green" stabilizer to yield FeS nanoparticles suitable for the in-situ injection uses, and to use them as an in-situ remediation technology for lead immobilization in soil or sediment. The specific goals include 1) to synthesize a new class of FeS nanoparticles using carboxylmethyl cellulose as a stabilizer; 2) to characterize the FeS nanoparticles; 3) to study the mobility of FeS nanoparticles in soil; and 4) to investigate the efficiency of lead immobilization by using FeS nanoparticles in soil.

II. Methods and Materials 2.1 Preparation of Ion Sulfide Nanoparticles

Similar to the procedures for iron phosphate nanoparticles preparation, solutions used for iron sulfide nanoparticle synthesis were prepared the anaerobic chamber using degassed DI water and all procedures for the preparation were also conducted in the chamber where 20 mL 7.20 mM $FeSO_4.7H_2O$. was mixed with 50 mL 1% CMC solution for 30 min. Then 20 mL 7.20 mM $Na_2S.9H_2O$ was added to the mixture dropwise. 0.1 M NaOH was used to keep final pH of the solution at 7.3 (Osseo-Asare and Wei, 1993) and the final volume of the prepared solution was about 100 mL.

2.2 Soil samples, amendment procedures, TCLP procedure used in the study were identical to those described in the iron phosphate nanoparticle of Example 1.

III. Results and Discussions 3.1 Characterization of the Iron Sulfide Nanoparticles Similar to Examples 1-3, the CMC stabilized iron sulfide precipitant was present as discrete particles while the non-stabilized counterpart showed as agglomerated flocs in morphology. Therefore stabilized iron sulfide showed much greater soil transportability than the non-stabilized one.

Minteq calculation indicated that the 99.3% of added $Fe^{2+}$ and $S^{2+}$ in the solution precipitated with 0.01 mM the iron and sulfide remained in the solution and 1.43 mM FeS solid (Mackniwawite) was produced as nanosized particles. The following reaction reveals the process of FeS formation:

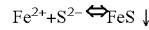

3.2 Effects of FeS Nanoparticle on Pb Leachability

Figure 15:
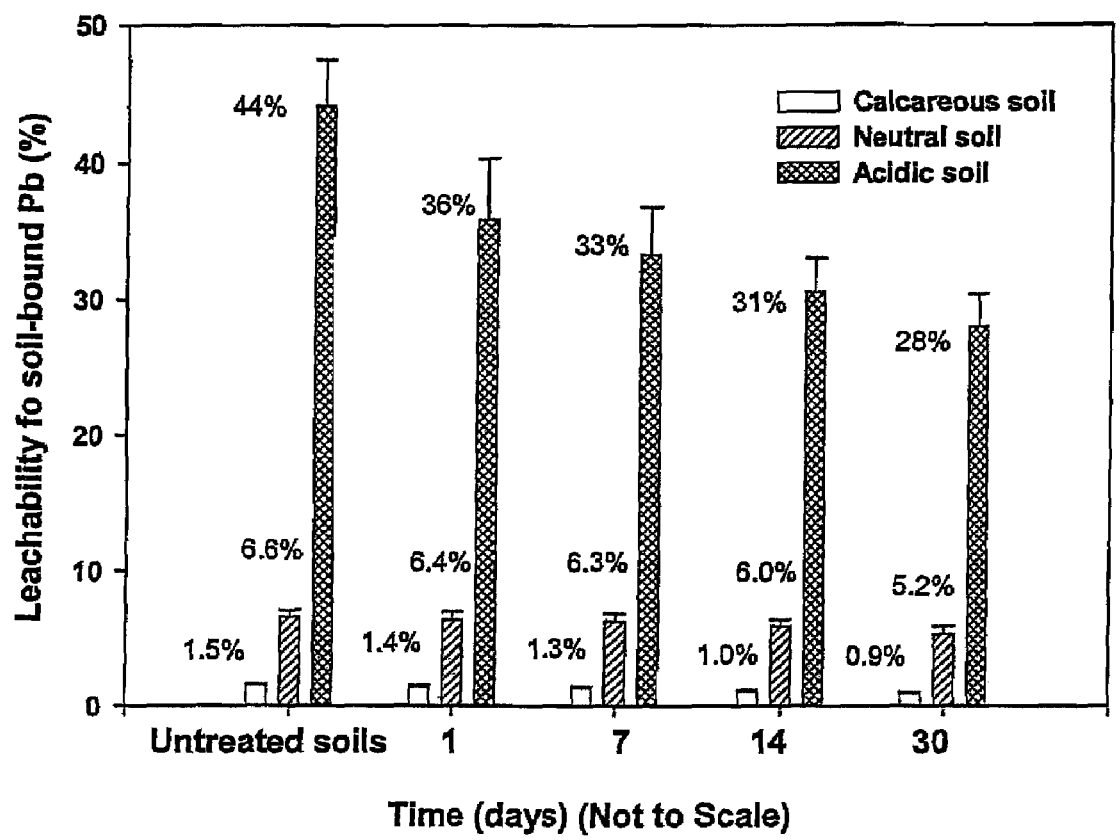
FIG. 15 is a bar graph illustrating changes in lead leachability in soils after the soils were treated with iron sulfide nanoparticles at a ratio of 2:1 (mL:g)

FIG. 15 shows the changes of Pb leachability in three soils with time after the soil samples were amended with FeS nanoparticles in case 1 where the ratio of the nanoparticle to soil was 2:1 and the molar ratio of FeS to Pb in soils was about 1:1. Results indicated that nanoparticle showed a prominent impact on decreasing the Pb leachability for acidic soil. Pb leachability decreased from 44% to 28% after 1 M with a reduction of 36.4%. The Pb concentrations in the TCLP extract reduced from 14 mg/L to 9.00 mg/L (Table 7). for the neutral soil calcareous soil, the Pb leachability in the exhibited a slower but also obvious tendency of reduction: one-month reduction rate was 21% and 40% for the NS and CS respectively.

TABLE 7

Pb concentration in the TCLP extracts of soils amended with FeS nanoparticles

| Aging time (day) | Solution to soil ratio 2:1 | | | Solution to soil ratio 10:1 | | |
|---|---|---|---|---|---|---|
| | CS | NS | AS | CS | NS | AS |
| Untreated | 0.46 ± 0.01 | 2.29 ± 0.17 | 14.13 ± 1.06 | 0.46 ± 0.01 | 2.29 ± 0.17 | 14.13 ± 1.06 |
| 1 | 0.42 ± 0.04 | 2.21 ± 0.22 | 11.47 ± 1.44 | 0.33 ± 0.04 | 2.20 ± 0.18 | 8.34 ± 1.12 |
| 7 | 0.40 ± 0.04 | 2.17 ± 0.21 | 10.64 ± 1.12 | 0.30 ± 0.05 | 2.17 ± 0.27 | 7.99 ± 0.65 |
| 14 | 0.30 ± 0.05 | 2.05 ± 0.16 | 9.77 ± 0.80 | 0.25 ± 0.02 | 1.79 ± 0.12 | 7.73 ± 0.46 |
| 30 | 0.26 ± 0.04 | 1.83 ± 0.22 | 8.96 ± 0.75 | 0.21 ± 0.02 | 1.63 ± 0.11 | 6.76 ± 0.35 |

Figure 16:
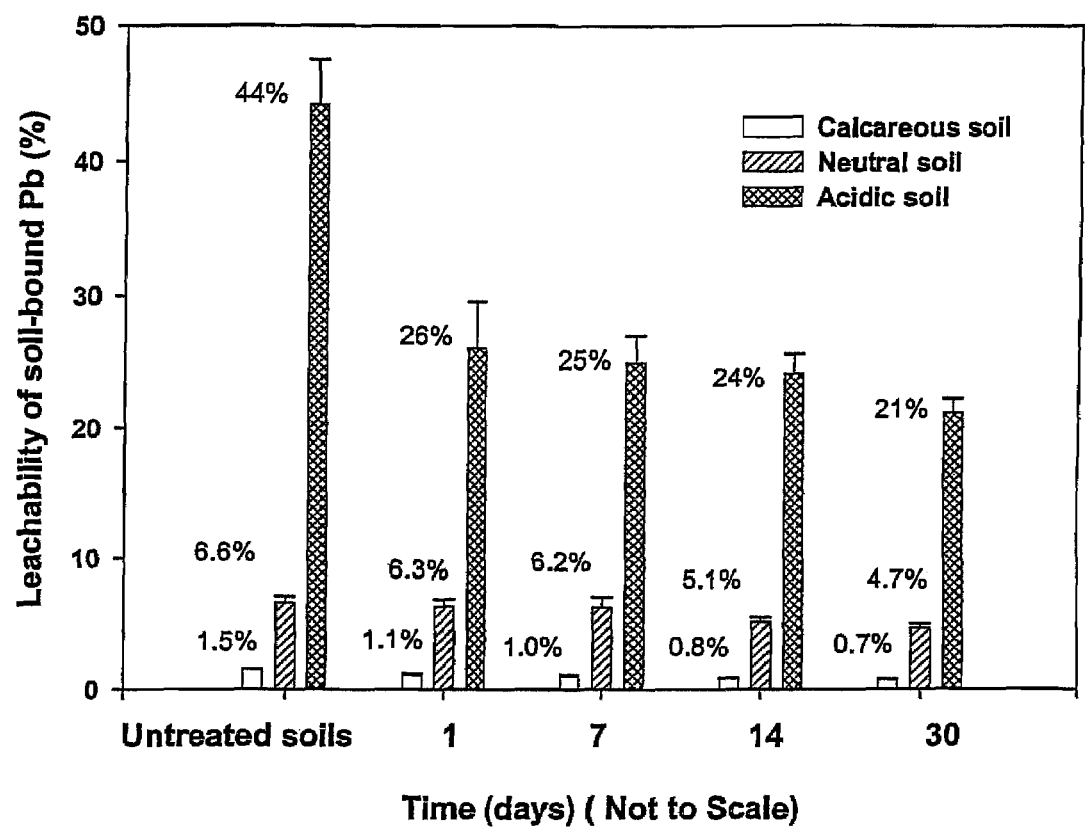
FIG. 16 is a bar graph similar to FIG. 15 except the soils were treated with iron sulfide nanoparticles at a ratio of 10:1 (mL:g)

Increased reduction rate of Pb leachability was observed (FIG. 16) when the amendment ratio increased from 2:1 to 10:1 where the molar ratio of FeS to soil Pb was 5:1. In this case, the 1-month reduction rates were 52.3% for acidic soil, 28.8% for the neutral soil and 53.3% for the calcareous soil. The changes of Pb concentration in the TCLP extract could be found in Table 7. The following equation may be responsible for the Pb leachability changes with FeS amendment.

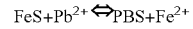

Where $K_{sp}$ for FeS and PbS are $8 \times 10^{-19}$ and $3 \times 10^{-28}$

EXAMPLE 5

I. Introduction

The objectives of this study are to synthesis stable and dispersive magnetite ($Fe_3O_4$) nanoparticles using a low-cost, food-grade polysaccharide (e.g. cellulose) as an effective and "green" stabilizer to yield magnetite nanoparticles suitable for the in-situ injection uses, and to use them as an in-situ remediation technology for lead immobilization in soil or sediment. The specific goals include 1) to synthesize a new class of magnetite nanoparticles using carboxylmethyl cellulose as a stabilizer; 2) to characterize the magnetite nanoparticles; 3) to study the mobility of magnetite nanoparticles in soil; and 4) to investigate the efficiency of lead immobilization by using magnetite nanoparticles in soil.

II. Materials and Methods 2.1 Preparation of Nano-Sized Magnetites

The magnetite ($Fe_3O_4$) nanoparticles were prepared by following a method described by Si et al., 2004. The major procedures were introduced as follows. An aqueous solution of $Fe_3O_4.7H_2O$ (50 mL, 0.1 M) was added dropwise to a 50 mL aqueous solution of 1% (w/v) NaCMC (sodium salt of carboxymethyl cellulose) with continuous stirring. The final concentration of the polymer in the medium was 0.5% (w/v). The mixture was stirred for 30 min to complete the formation of the iron-polymer complex. The pH of the solution was then increased slowly to higher than 10 by adding 0.1 M NaOH solution. The reaction mixture (150 mL in volume) was subsequently aged for 1 h with constant stirring. The final concentration of Fe in the solution was about 0.03 M and the final pH was 12.0.

2.2 Soil samples, soil amendment procedures, TCLP procedure used in the study were identical to those described in the iron phosphate nanoparticle of Example 1.

III. Results and Discussions 3.1 Characterization of the Iron Oxide Nanoparticles Si et al. (2004) indicated that the TEM particle size of the magnetite nanoparticle prepared with 0.5% NaCMC was 14.4±0.92 nm (standard deviation). The following reaction may be responsible for the formation of magnetite in this study although the detailed mechanism is still unclear (Si et al, 2004).

$$Fe^{2+}+O_2+OH^- \Leftrightarrow Fe_3O_4+H^+$$

Similar to Examples 1-4, the CMC stabilized magnetite precipitant was present as discrete particles while the non-stabilized counterpart showed as agglomerated flocs in morphology. Therefore, stabilized magnetic showed much greater soil transportability than the non-stabilized one.

3.2 Effects of Magnetite ($Fe_3O_4$) Nanoparticle on Pb Leachability

Figure 17:
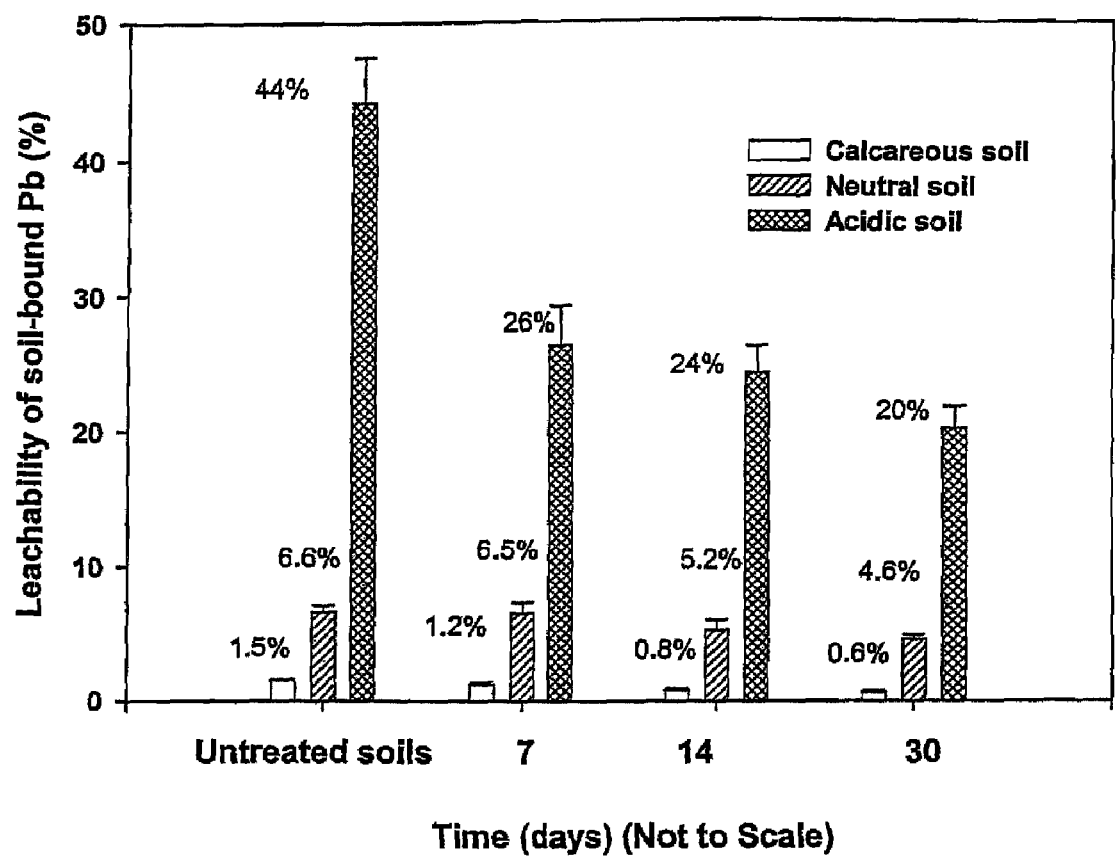
FIG. 17 is a bar graph illustrating changes in lead leachability in soils after the soils were treated with magnetite nanoparticles at a ratio of 2:1 (mL:g)
Figure 18:
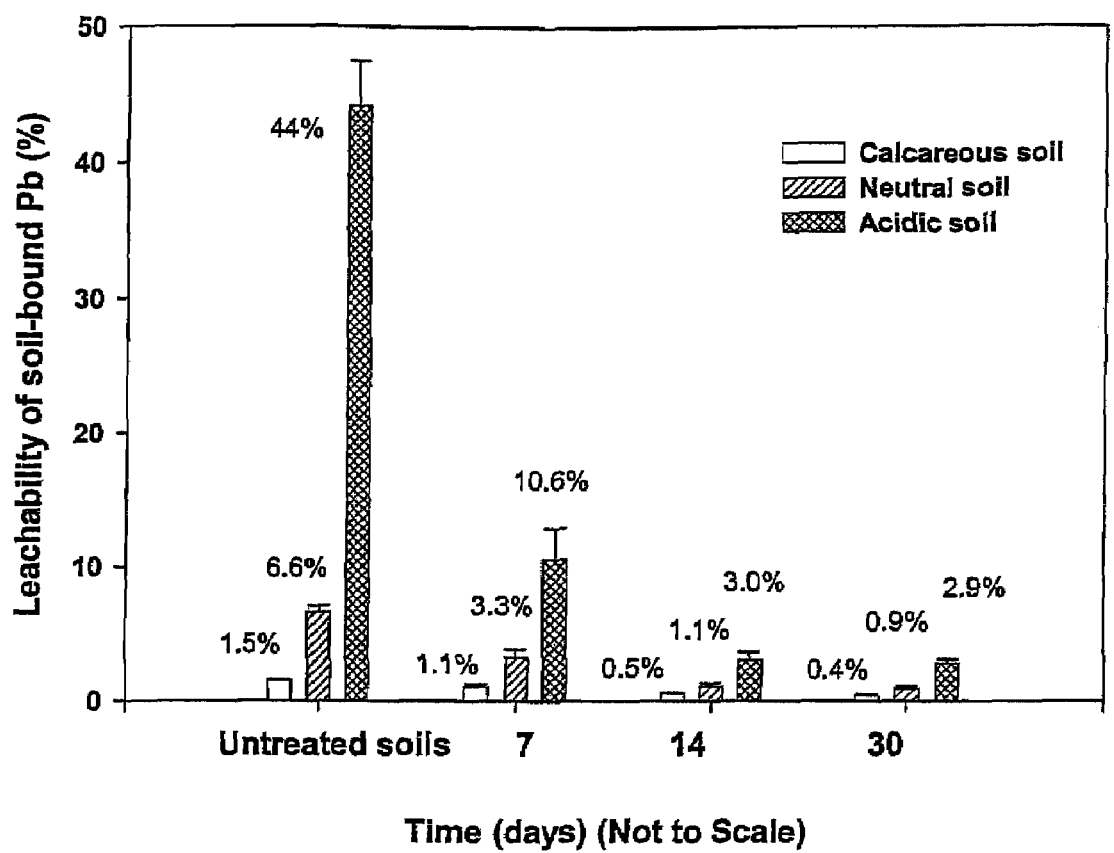
FIG. 18 is a bar graph similar to FIG. 17 except the soils were treated with magnetite nanoparticles at a ratio of 10:1 (mL:g).

Changes of soil Pb leachability with magnetite nanoparticle amendments are shown in FIGS. 17 and 18. As lower amendment ratio (solution to soil=2.1, Fe:Pb molar ratio = 20~23) was applied, Pb leachability exhibited moderate decreases with aging time (FIG. 17). For example, the acidic soil reduced by 54.5% in Pb leachability in a month while the neutral soil and calcareous soil showed 43.5% and 60% reductions, respectively Significant Pb immobilization was observed for those three soils when the amendment rate increase to 10:1 where Fe:Pb molar ratio-98 to 114 (FIG. 18): TCLP leachability of Pb in the acidic soil decreased by 93.4% in a month from the initial 44% to the final 20% and 86.4% reduction was observed for the neutral soil after 1 month aging. For calcareous soil, the reduction was 73.3%. Table 8 shows the changes of Pb concentrations in the TCLP extracts of the three soils with time.

TABLE 8

Pb concentration in the TCLP extracts of soils amended with magnetite nanoparticles

| Aging time | Solution to soil ratio 2:1 | | | Solution to soil ratio 10:1 | | |
|---|---|---|---|---|---|---|
| (day) | CS | NS | AS | CS | NS | AS |
| Untreated | 0.46 ± 0.01 | 2.29 ± 0.17 | 14.13 ± 1.06 | 0.46 ± 0.01 | 2.29 ± 0.17 | 14.13 ± 1.06 |
| 7 | 0.36 ± 0.09 | 2.26 ± 0.28 | 8.43 ± 0.93 | 0.32 ± 0.09 | 1.13 ± 0.21 | 8.38 ± 0.73 |
| 14 | 0.24 ± 0.04 | 1.81 ± 0.26 | 7.76 ± 0.64 | 0.16 ± 0.02 | 0.37 ± 0.09 | 0.97 ± 0.19 |
| 30 | 0.18 ± 0.03 | 1.59 ± 0.11 | 6.47 ± 0.51 | 0.12 ± 0.04 | 0.31 ± 0.07 | 0.89 ± 0.10 |

I claim:

1. A method of immobilizing toxic metals in a toxic metal contaminated site, comprising the steps of:
   (a) providing a composition comprising:
       (i) a liquid carrier,
       (ii) stabilized nanoparticles dispersed in the liquid carrier, wherein the metal nanoparticles comprise an iron phosphate, and
       (iii) a stabilizer to control the dispersibility of the metal nanoparticles in the liquid carrier; and
   (b) delivering an effective amount of said composition to a toxic metal contaminated site so that said nanoparticles immobilize one or more toxic metals in said site.

2. The method of claim 1 wherein the step of delivering said composition comprises injecting said composition into said contaminated site.

3. The method of claim 1 wherein the step of delivering said composition comprises spraying said composition onto said contaminated site.

4. The method of claim 1 wherein said contaminated site comprises soil.

5. The method of claim 1 wherein said contaminated site comprises sediment.

6. The method of claim 1 wherein said contaminated site comprises solid and hazardous wastes.

7. The method of claim 1 wherein said contaminated site comprises ground water.

8. The method of claim 1 wherein said contaminated site comprises surface water.

9. The method of claim 1 wherein said one or more toxic metals is selected from the group consisting of arsenic, cadmium, chromium, copper, lead, mercury, nickel and zinc.

10. The method of claim 1 wherein said one or more toxic metals is mercury.

11. The method of claim 1 wherein said one or more toxic metals is lead.

12. The method of claim 1 wherein said metal nanoparticles have a particle size ranging from about 1 nm to about 200 nm.

13. The method of claim 1 wherein said effective amount is about 0.001 g/L to about 5 g/L.

14. The method of claim 1 wherein said liquid carrier comprises water.

15. The method of claim 1 wherein said stabilizer is selected from the group consisting of water soluble starch, carboxymethyl starch, thiolated starch, aminated starch, sodium carboxymethyl cellulose, carboxymethyl chitosan, and mixtures thereof.

16. A method of reducing the leachability of lead in a lead contaminated site, comprising the steps of:
   (a) providing a composition comprising iron phosphate nanoparticles dispersed in a liquid carrier and a stabilizer to control the dispersibility of the iron phosphate nanoparticles in the liquid carrier; and
   (b) delivering an effective amount of said composition to a lead contaminated site so that said iron phosphate nanoparticles immobilize the lead in said site.

17. The method of claim 16 wherein the step of delivering said composition comprises injecting said composition into said contaminated site.

18. The method of claim 16 wherein the step of delivering said composition comprises spraying said composition onto said contaminated site.

19. The method of claim 16 wherein said contaminated site comprises soil.

20. The method of claim 16 wherein said contaminated site comprises sediment or solid and hazardous wastes.

21. The method of claim 16 wherein said contaminated site comprises ground water.

22. The method of claim 16 wherein said contaminated site comprises surface water.

23. The method of claim 16 wherein said iron phosphate nanoparticles have a particle size ranging from about 1 nm to about 200 nm.

24. The method of claim 16 wherein said effective amount is about 0.001 g/L to about 5 g/L.

25. The method of claim 16 wherein said liquid carrier comprises water.

26. The method of claim 16 wherein said stabilizer is selected from the group consisting of water soluble starch, carboxymethyl starch, thiolated starch, aminated starch, sodium carboxymethyl cellulose, carboxymethyl chitosan, and mixtures thereof.

27. The method of claim 16 further including adding chloride to said composition in an amount of from about 50 mg/L to about 500 mg/L.

28. The method of claim 27 wherein said chloride is sodium chloride.

29. A composition comprising:
    (a) a liquid carrier;
    (b) metal nanoparticles dispersed in said liquid carrier, wherein the metal nanoparticles comprise an iron phosphate; and
    (c) a stabilizer comprising a polysaccharide to control the dispersibility of the metal nanoparticles in the liquid carrier.

30. The composition of claim 29 wherein said metal nanoparticles have a particle size ranging from about 1 nm to about 100 nm.

31. The composition of claim 29 wherein said liquid carrier comprises water.

32. The composition of claim 29 wherein said stabilizer is selected from the group consisting of water soluble starch, carboxymethyl starch, thiolated starch, aminated starch, sodium carboxymethyl cellulose, carboxymethyl chitosan, and mixtures thereof.

33. The method of claim 1, wherein the stabilizer comprises carboxymethylcellulose.

34. The method of claim 16, wherein the stabilizer comprises carboxymethylcellulose.

35. The composition of claim 29, wherein the stabilizer comprises carboxymethylcellulose.

36. The method of claim 1, wherein the composition is prepared by:
    (i) adding a solution comprising iron cations to a solution comprising a polysaccharide; and
    (ii) subsequently adding a solution comprising phosphate anions to the solution comprising the iron cations and the polysaccharide.

37. The method of claim 16, wherein the composition is prepared by:
    (i) adding a solution comprising iron cations to a solution comprising a polysaccharide; and
    (ii) subsequently adding a solution comprising phosphate anions to the solution comprising the iron cations and the polysaccharide.

38. The composition of claim 29 prepared by:
    (i) adding a solution comprising iron cations to a solution comprising a polysaccharide; and
    (ii) subsequently adding a solution comprising phosphate anions to the solution comprising the iron cations and the polysaccharide.

* * * * *